US012385317B2

(12) United States Patent

Gorman

(10) Patent No.: US 12,385,317 B2
(45) Date of Patent: Aug. 12, 2025

(54) GLAZED PANEL INSTALLATION SYSTEM AND METHOD

(71) Applicant: CHAMPION TRUST LLC, Fort Lauderdale, FL (US)

(72) Inventor: Christopher Allen Gorman, Fort Lauderdale, FL (US)

(73) Assignee: CHAMPION TRUST LLC, Fort Lauderdale, FL (US)

( * ) Notice: Subject to any disclaimer, the term of this patent is extended or adjusted under 35 U.S.C. 154(b) by 82 days.

(21) Appl. No.: 17/889,000

(22) Filed: Aug. 16, 2022

(65) Prior Publication Data

US 2022/0389751 A1 Dec. 8, 2022

Related U.S. Application Data

(62) Division of application No. 17/188,213, filed on Mar. 1, 2021, now Pat. No. 11,414,914.

(Continued)

(51) Int. Cl.

*E06B 1/36* (2006.01)
*E06B 1/56* (2006.01)
*E06B 1/60* (2006.01)

(52) U.S. Cl.

CPC .................. *E06B 1/36* (2013.01); *E06B 1/56* (2013.01); *E06B 1/6015* (2013.01)

(58) Field of Classification Search

CPC . E06B 1/36; E06B 1/56; E06B 1/6015; E06B 1/60

(Continued)

(56) References Cited

U.S. PATENT DOCUMENTS 1,660,408 A 4/1928 Bayley
2,504,701 A 4/1950 Krantz (Continued)

FOREIGN PATENT DOCUMENTS

CA 2225952 6/1999
DE 102009005177 7/2010

(Continued)

OTHER PUBLICATIONS

Machine Translation of WO 2015051985 obtained by the European Patent Office at https://worldwide.espacenet.com/obtained on Nov. 22, 2021.

(Continued)

*Primary Examiner* — Paola Agudelo

(74) *Attorney, Agent, or Firm* — The Concept Law Group, PA; Scott D. Smiley; Scott M. Garrett

(57) ABSTRACT

A fenestration opening is provided with opposing receptors on opposite sides of the fenestration opening. Each of the receptors is configured to capture and opposing end of a glazed panel with a capture feature or features on each receptor that hold the respective end of the glazed panel from moving laterally, in or out of the fenestration opening. The glazed panel is installed by angling the glazed panel with respect to the fenestration opening and inserting one end of the glazed panel into engagement with one of the receptors, then moving the opposite end of the glazed panel so that the panel is aligned between the receptors, and then moving the panel so that the opposite end of the receptor is captured by the opposite receptor.

20 Claims, 25 Drawing Sheets

Related U.S. Application Data

(60) Provisional application No. 63/058,926, filed on Jul. 30, 2020.

(58) Field of Classification Search
USPC ................................................ 49/425; 52/213
See application file for complete search history.

(56) References Cited

U.S. PATENT DOCUMENTS

| | | | | |
|---|---|---|---|---|
| 2,504,702 | A | 4/1950 | Krantz | |
| 2,629,467 | A | 2/1953 | Fry | |
| 2,771,970 | A * | 11/1956 | Geyser | E06B 1/56 52/204.5 |
| 2,788,099 | A * | 4/1957 | Geyser | E06B 1/6046 52/214 |
| 2,863,180 | A * | 12/1958 | Birdwell | E06B 3/60 52/209 |
| 3,119,155 | A * | 1/1964 | Schlegel | E06B 1/6061 49/495.1 |
| 3,267,629 | A | 8/1966 | Waring et al. | |
| 3,315,426 | A | 4/1967 | Rolland | |
| 3,568,383 | A | 3/1971 | Judkins et al. | |
| 4,151,691 | A * | 5/1979 | Wendt | E04B 2/82 52/395 |
| 4,881,768 | A | 11/1989 | Lange | |
| 5,392,574 | A * | 2/1995 | Sayers | E06B 1/30 52/204.55 |
| 5,884,361 | A * | 3/1999 | Richardson | E05F 1/16 16/102 |
| 6,173,541 | B1 | 1/2001 | Petta | |
| 6,427,398 | B1 * | 8/2002 | Levine | E06B 1/28 52/745.15 |
| 6,532,705 | B1 * | 3/2003 | Gorman | E06B 1/6015 52/212 |
| 8,776,460 | B2 | 7/2014 | Carlson et al. | |
| 8,776,461 | B2 * | 7/2014 | Carlson | E06B 1/56 52/60 |
| 9,115,489 | B2 * | 8/2015 | Bourdon | E04B 1/36 |
| 9,512,656 | B2 * | 12/2016 | Lee | E05D 15/0682 |
| 9,631,373 | B2 | 4/2017 | Loyd | |
| 9,920,522 | B2 | 3/2018 | Staten et al. | |
| 2001/0020350 | A1 | 9/2001 | Gorman | |
| 2007/0245649 | A1 * | 10/2007 | Habeck | E06B 1/62 52/212 |
| 2008/0054137 | A1 | 3/2008 | Poulin | |
| 2008/0190030 | A1 * | 8/2008 | Cheon | E05D 15/0665 49/425 |
| 2009/0108154 | A1 | 4/2009 | Lucci | |
| 2010/0115877 | A1 * | 5/2010 | Yoo | E05D 15/0686 52/656.2 |
| 2011/0041431 | A1 | 2/2011 | McKenna | |
| 2011/0258947 | A1 | 10/2011 | Peterson | |
| 2016/0115726 | A1 | 4/2016 | Hodgson et al. | |
| 2019/0112863 | A1 | 4/2019 | Rocca, Jr. et al. | |
| 2020/0347665 | A1 | 11/2020 | Gordon | |
| 2021/0238911 | A1 | 8/2021 | Theriault | |
| 2021/0246712 | A1 | 8/2021 | Crochetiere et al. | |
| 2021/0277710 | A1 | 9/2021 | Edlin et al. | |

FOREIGN PATENT DOCUMENTS

| | | |
|---|---|---|
| DE | 202018103083 | 7/2018 |
| EP | 0890698 | 1/1999 |
| EP | 2226456 | 9/2010 |
| EP | 2886772 | 6/2015 |
| EP | 3438394 | 7/2018 |
| GB | 2351766 | 1/2001 |
| WO | 2015051985 | 4/2015 |
| WO | 2017068408 | 4/2017 |

OTHER PUBLICATIONS

Derwent Abstract of KR 2031955 B1 by Hyun (Year: 2019).

* cited by examiner

800

GLAZED PANEL INSTALLATION SYSTEM AND METHOD

CROSS-REFERENCE

This application is a divisional of U.S. patent application Ser. No. 17/188,213, filed Mar. 1, 2021, and granted as U.S. Pat. No. 11,414,914 on Aug. 16, 2022, and through that application further claims priority to U.S. provisional application No. 63/058,926, filed Jul. 30, 2020, the entireties of each of which are hereby incorporated by reference.

FIELD OF THE INVENTION

The present invention relates generally to the design of commercial fixed windows, and, more particularly, relates to a system that allows substantially simpler installation of residential and commercial fixed and operable windows in building fenestrations by a unique structural attachment in which the window unit floats in and is captured by receptors.

BACKGROUND OF THE INVENTION

Many commercial buildings have fixed windows, including office buildings, hotels, and other buildings. These windows are not able to be opened, which is why they are referred to as "fixed." A common arrangement of fixed windows involves the building being designed with individual window openings in the exterior wall. This is different than, for example, buildings that use continuous glass to form a curtain wall on the exterior of the building. For these individual windows, fixed windows are typically installed using prepared window units. A window unit contains the glass, and a carrier, that is made of a material such as aluminum or vinyl, in which the glass is mounted. The window unit is prepared for a given size window opening by cutting the glass to size so that the carrier containing the glass will fit into the window opening. To install the window unit, the window unit is lifted into place in a window opening, and then screws are used to fasten the window unit to the four sides of the window formed by the walls and sills. Caulking is then applied on the exterior around the window unit to prevent water ingress. These kinds of windows are used in both commercial and residential applications, and for both operable and fixed windows in building fenestrations.

One of the issues using this conventional approach is the amount of time it takes to install each window unit. Once the window unit it is place, it must be stabilized in place while being held, and then fasteners such as screws are driven through the aluminum carrier into the walls and sills to hold the window panel in place. The crew needed to lift and install the window units is substantial. Typically, after applying the fasteners, an inspection of the installed window units is performed, which may occur days or weeks after the window units are installed. Once the inspection process is complete, then screw cover panels are installed on the carrier to prevent removal of the screws. Accordingly, it can take a substantial period of time to install the windows.

Therefore, a need exists to overcome the problems with the prior art as discussed above.

SUMMARY OF THE INVENTION

In accordance with the inventive disclosure, there is provided a method for installing fixed windows, that includes installing an upper window panel receptor in a top of a window opening and installing a lower window panel receptor in a bottom of the window opening. The lower window panel receptor is "U" shaped and has a base with sides extending perpendicularly to the base of the lower window panel receptor. The upper window panel receptor is "U" shaped and has a base with sides extending perpendicularly to the base. The sides of the upper window panel receptor are longer than the sides of the lower window panel receptor. The method further includes placing a window panel into the window opening such that a top of the window panel is captured between the sides of the upper window panel receptor and a bottom of the window panel is captured between the sides of the lower window panel receptor.

In accordance with a further feature, wherein the window opening is rectangular, placing the window panel into the window opening comprises inserting the top of the window panel into the upper window panel receptor and lifting the window panel so that the bottom of the window panel is above the sides of the lower window panel receptor. While the top of the window panel is inserted into the upper window panel receptor, the method further includes moving the bottom of the window panel over the lower window panel receptor. The method further includes lowering the window panel such that the bottom of the window panel is inserted into the lower window panel receptor.

In accordance with the inventive disclosure, there is provided a system for installing fixed window units that includes an upper window panel receptor in a top of a window opening and a lower window panel receptor in a bottom of the window opening. The lower window panel receptor is "U" shaped and has a base with sides extending perpendicularly to the base of the lower window panel receptor. The upper window panel receptor is "U" shaped and has a base with sides extending perpendicularly to the base. The sides of the upper window panel receptor are longer than the sides of the lower window panel receptor. The system includes a window panel placed in the upper window panel receptor and the lower window panel receptor such that a top of the window panel is captured between the sides of the upper window panel receptor and a bottom of the window panel is captured between the sides of the lower window panel receptor.

Although the invention is illustrated and described herein as embodied in a fixed window installation method and system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance. Furthermore, relational terms are used, such as "opposite" and "opposing." These terms refer to opposite ends or sides of something. A distal end of something is opposite a proximate end, a top end is opposite a bottom end, and so on.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
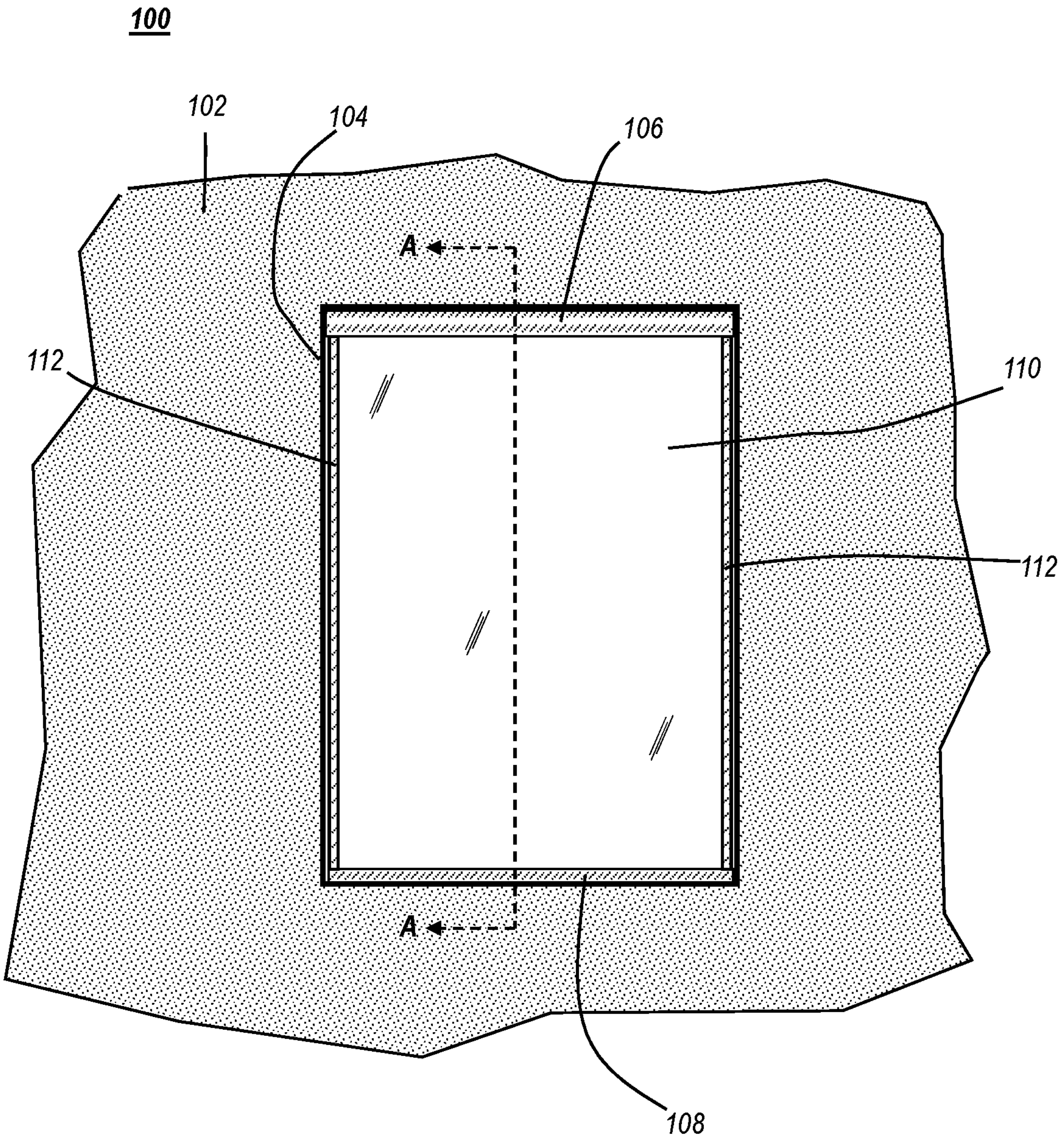
FIG. 1 is an external elevational view of an installed window unit using upper and lower window panel receptors, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 21:
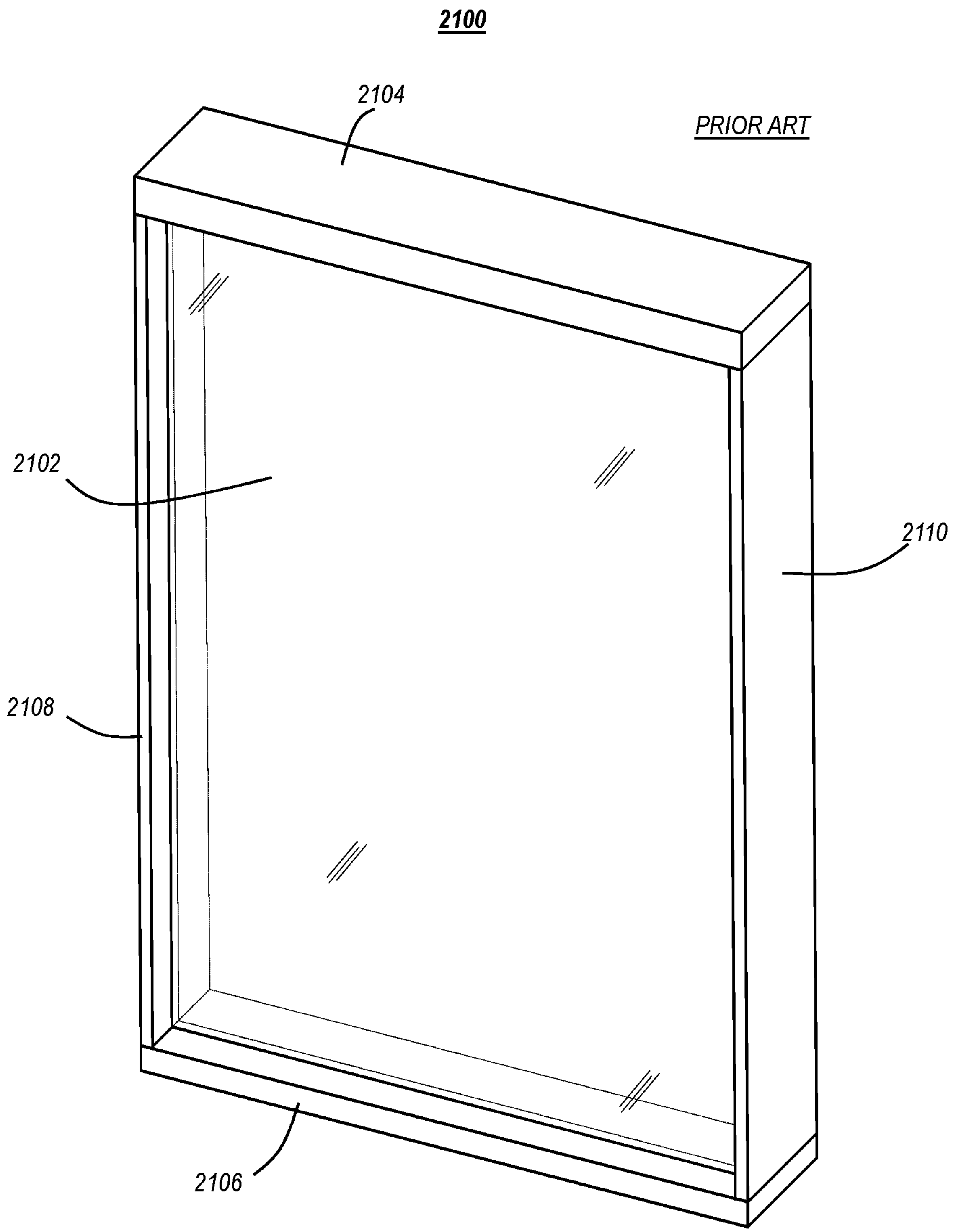
FIG. 21 shows a perspective view of generalized window panel.

The present inventive disclosure provides a novel and efficient window installation system generally for glazed panels, such as, for example, commercial fixed windows. In general, a glazed panel is any structure holding one or more glass panes in a frame. This can include moveable windows, sliding glass doors, fixed windows, residential windows, commercial windows, and so on. These glazed panels are installed in fenestration openings in the walls of buildings such that the frame of the panel is held in place and weather sealed. In general, the system and components of the inventive disclosure make the installation of a panel in an opening of a wall greatly simplified and the construction process is substantially reduced in time. FIG. 21 shows a representation of a window panel 2100 as one example of a glazed panel. The window panel 2100 includes one or more panes of glass 2102 captured in a frame that is typically made of aluminum, wood, vinyl, or similar materials. The frame comprises a top member 2104, a bottom member 2106, and side members 2108, 2110. The portions of the window panel comprised of the top member 2104, the bottom member 2106, and side members 2108 and 2110 are referred to herein as ends. Thus, the window panel 2100 has two sets of opposing ends, where a first end, such as the top member 2104, opposes a second end, such as bottom member 2106. While an "end" includes the outermost surface (e.g. the top surface 2112), it also includes a portion of the sides (e.g. side 2114) of the frame member in a direction parallel to the pane 2102. Each frame member 2014, 2106, 2108, 2110 will have opposing sides, which can be referred to as the interior and exterior sides, or simply first and second sides. As such, an end in some embodiments can include one to two inches of the side from the outermost surface of that end.

A similar frame arrangement can also be used to capture sliding elements including window and door assemblies that can be opened and closed, as is well known. In the construction of a building, standard sized openings for windows and door can be used, as well as custom designed openings to serve ornamental/architectural purposes. Window panels likewise be constructed to fit into standard or custom sized openings. The frame members 2104-2110 are typically screwed together, and vinyl strips are placed between the glass pane(s) 2102 and the frame members as both a weather seal and to provide some resilient "cushion" to prevent breakage. Other features such as weep holes, for example, that are well known, are also included in the construction of the window panel 2100.

Conventionally, a window panel such as panel 2100 is lifted into an opening, and upon aligning and placement of any weather sealing or other materials, the window panel is screwed to the wall support portions forming the opening, such as a sill, jambs, and lintel, which form the structural support around the opening in which the window panel is mounted. Once screwed into place, caulking is then applied to seal the panel to the structure. In the construction of buildings with many window panels, such as, for example, hotels and office buildings, the process of lifting a window panel into, aligning it, and then screwing it into place is time consuming.

To simplify the process of installing window and other types of glazed panels, embodiments of the inventive disclosure provide for installing receptors in a window opening of a wall. The window opening is a fenestration opening intended to receive the window panel. That is, the wall and sills include elements to ensure that the window panel will remain in place given the effects of wind, gravity, rain, etc. Rather than directly attaching the window panel to the walls and sills, an upper window panel receptor is mounted on top portion of the window opening, and a lower window panel receptor is mounted in the lower or bottom portion of the window opening. The upper and lower window panel receptors are sized so that the top of window panel can be inserted into the upper window panel receptor, at a slight angle. Once the window panel is raised into the upper window panel receptor sufficient for the bottom of the window panel to clear the lower window panel receptor, then the bottom of the window panel can be swung over the lower window panel receptor and lowered into the lower window panel receptor. The window panel is held in place by the upper and lower window panel receptors, and the sides can then be caulked to prevent water ingress. As a result, the window panel is "floating" in the receptors because it is not directly attached to any part of the building structure. Using this method and arrangement of components it has been found that a substantial amount of time can be saved installing windows in a building. What would take weeks for a given job to be completed can be done in a matter of hours using the inventive method and components. In addition to ease of installation, vibrations experienced by the building structure are not as tightly coupled to the window glass, giving the inventive window system resistance to such events as earthquakes.

FIG. 1 is an external elevational view of an installed window unit 100 using upper and lower window panel receptors, in accordance with some embodiments. Shown here the external wall 102 of a building having a window opening 104. The window opening 104 can be a rectangular opening in the external wall 102, and is bounded by the sides, top, and bottom by the wall 102. However, other configuration besides rectangular window openings can be used. Further, the sides, top, and bottom of the window opening 104 have been constructed to meet applicable building requirements for window installation. An upper window panel receptor 106 is installed on the top portion of the window opening, and a lower window panel receptor 108 is installed on the bottom portion of the window opening. A window panel is shown installed in the upper and lower window panel receptors 106, 108, and includes a glass section 110 that is surrounded by an aluminum structure 112 that holds the glass section 110. The glass section 110 is typically a glass laminate that is designed to resist breaking due to impact (e.g. "impact glass"). The window panel, as a unit, can be thought of as a frame that includes the glass section 110. It is constructed according to the size of the window opening 104, and can therefore be a custom size or a standardized size. While the glass section 110 can be on the order of one quarter inch to one inch thick in most application, the sides of the aluminum structure 112 will extend substantially further, having a front to back (the view here showing the front side) on the order of several inches. The aluminum structure 112 can surround the glass section 110 on all sides/edges of the glass section 110.

Figure 2:
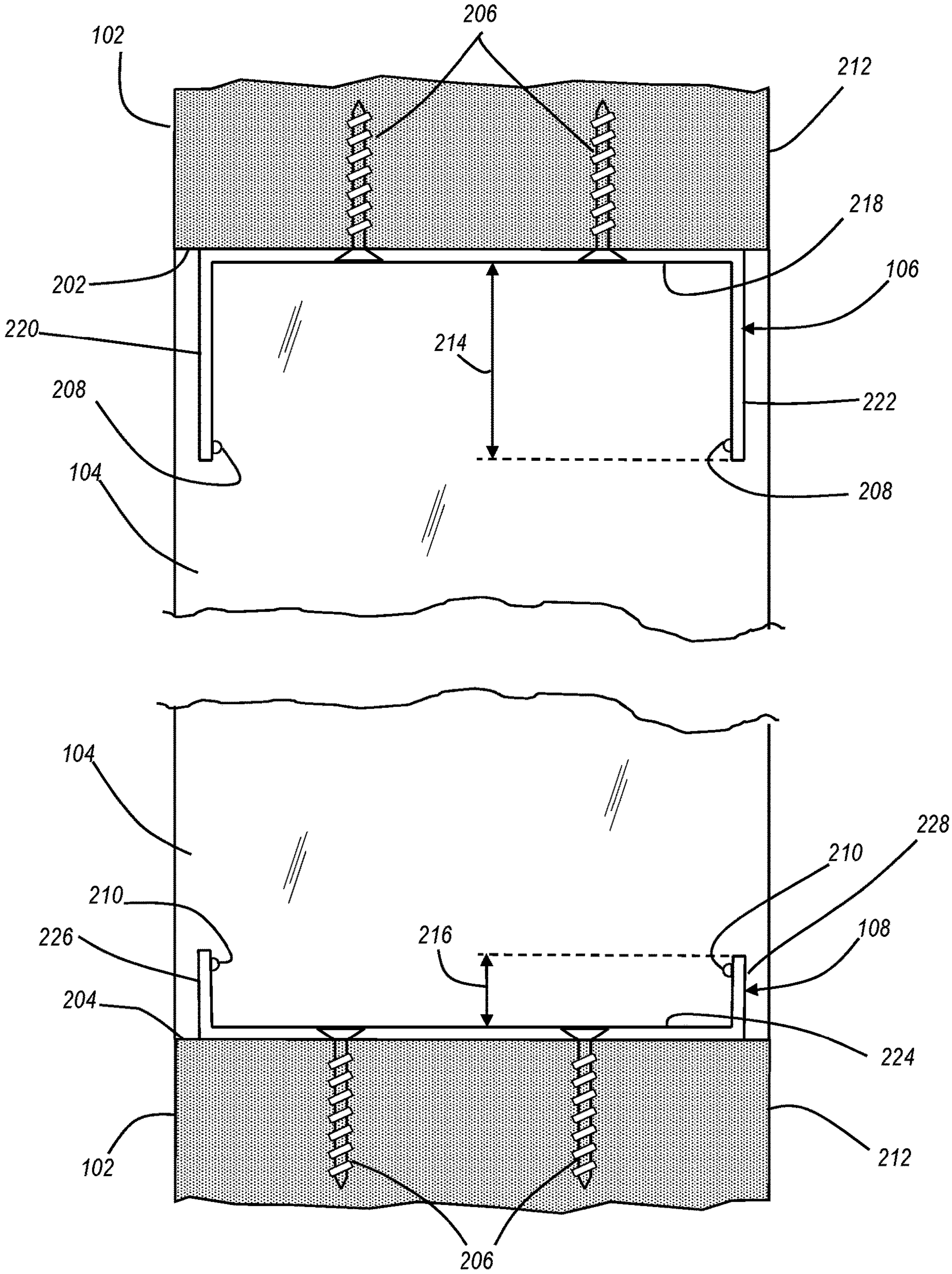
FIG. 2 is a side cross cut view of window opening with the upper and lower window panel receptors installed, and prior to the window panel being installed, in accordance with some embodiments.

FIG. 2 is a side cross cut view of window opening 104 with the upper and lower window panel receptors 106, 108 installed, and prior to the window panel being installed, in accordance with some embodiments. Specifically, the view shown here is looking in the direction of line A-A shown in FIG. 1. The middle section has been removed in the view as the side of the window opening is consistent from top to bottom. The external surface 102 of the wall is on the left, and the interior surface 212 is on the right. The upper window panel receptor 106 is mounted on the upper portion 202 of the window opening 104, and can be seen here to have a "U" shape with a flat base 218 that fits against the surface of the top portion 202 of the window opening 104, and sides 220, 222 that extend from the base 218 by a distance 214. Likewise the lower window panel receptor 108 has a flat base 224 and sides 226, 228 that extend a distance 216 from the base 224. The upper and lower window panel receptors 106, 108 can be attached to the upper and lower portions 202, 204 of the window opening 104 using screws 208. The upper window receptor 106 includes a pair of gasket members 208 on the inside of each of the sides 220, 222 near the end of the sides 220, 222 farthest from the base 218. The gasket members 208 run along the entirety of the sides 220, 222. Similarly, the lower window receptor 108 includes gasket members 210 positioned on the inside of sides 226, 228 which run along the entirety of the sides 226, 228. As shown in FIG. 1, the upper and lower window panel receptors span substantially the entire width of the window opening.

The height of the sides 220, 222, indicated by distance 214 is substantially greater than that of sides 226, 228, indicated by distance 216. In some embodiments distance 214 can be on the order of two inches, and distance 216 can be on the order of one inch. This allows the top of the window panel to be inserted into the upper window panel receptor 106, and then raised enough inside the upper window panel receptor 106 so that the bottom of the window panel clears the side 226 of the lower window panel receptor 108, allowing the bottom of the window panel to be swung, while the top of the window panel remains inserted between the sides 220, 222 of the upper window panel receptor 106, such that the bottom of the window panel is then aligned to fit between the sides 226, 228 of the lower window panel receptor 108. Once aligned, the window panel is allowed to lower into the lower window panel receptor 108. The window panel is wider at the top and bottom that the distance between gasket elements 208 in sides 220, 222 and gasket elements 210 in sides 226, 228, but is narrower at the top and bottom between the insides of sides 220, 222 and 226, 228, respectively. This ensures contact between the gasket elements 208, 210 and the window panel to create a water tight barrier.

Figure 3A:
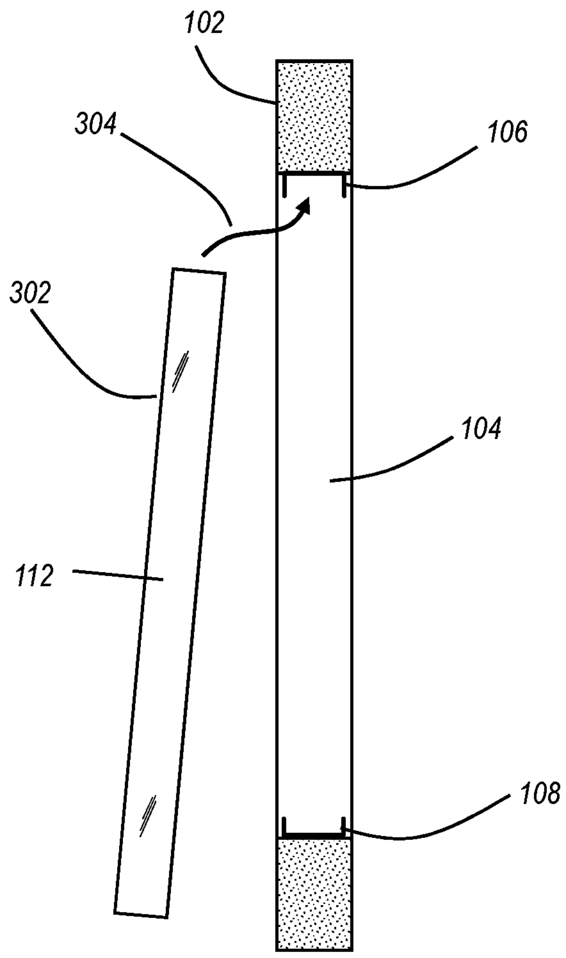
FIGS. 3A-3C show a side view cross cut view of a window opening in which a window panel is installed, in accordance with some embodiments.
Figure 3B:
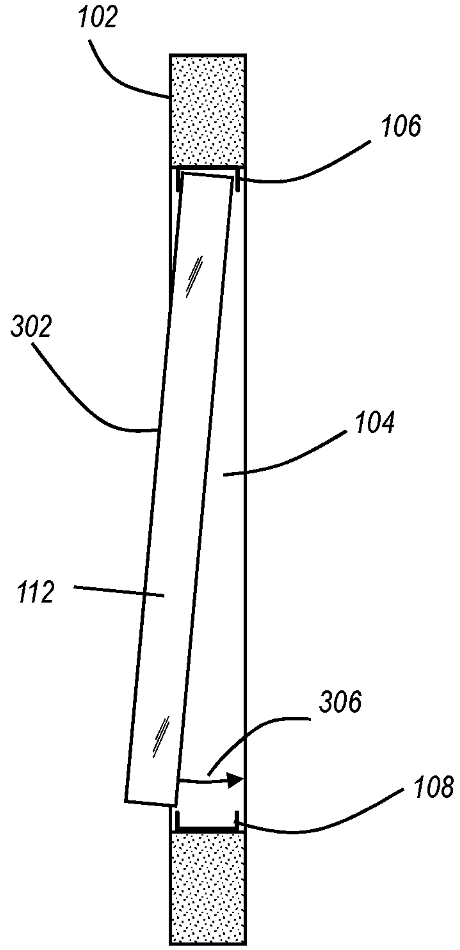
Figure 3C:
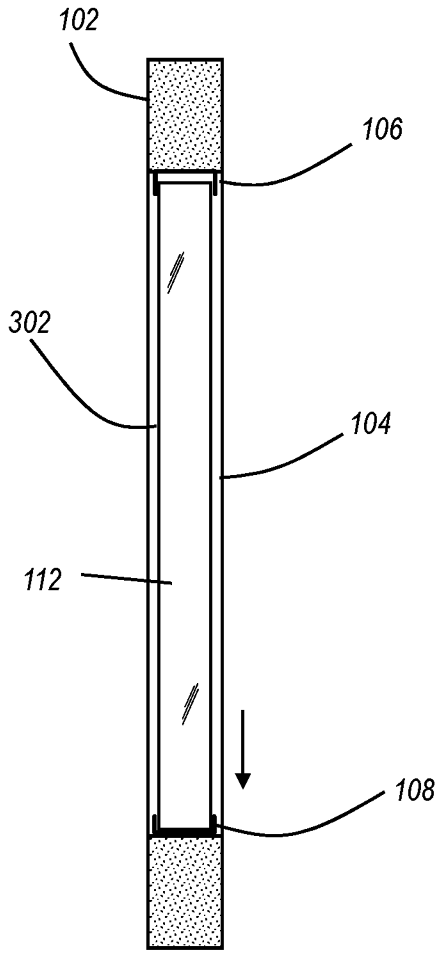

The above-described process is illustrated in FIGS. 3A-3C, which show a side view cross cut view of a window opening in which a window panel is installed, in accordance with some embodiments. FIGS. 3A-3C show the view of FIG. 2, but show the entire window opening 104. In FIG. 3A it can be seen that a window panel 302 is lifted towards window opening 104. Upper window panel receptor 106 and lower window panel receptor 108 are installed in the window opening 104 at the top and bottom portions, respectively, of the window opening 104 as shown in FIG. 2. The aluminum structure 112, seen here in a side view, is slightly narrower than the distance between the sides of the upper and lower window panel receptors 106, 108. As indicated by arrow 304, the top of the window panel 302 is inserted into the upper window panel receptor, at a slight angle to vertical. In FIG. 3B the top of the window panel 320 is inserted into the upper window panel receptor 106, and the bottom of the window panel 312 is raised high enough to be above the top of the sides 226, 228 (see FIG. 2) of the lower window panel receptor 108, and the bottom of the window panel 302 is swung in the direction of arrow 306 to be aligned with the lower window panel receptor 108. In FIG. 3C, the window panel is then lowered so that the bottom of the window panel 302 is inserted between the sides (e.g. 226, 228) of the lower window panel receptor 108. The window panel 302 is sized so that, even though the bottom of the window panel 302 is lowered into the lower window panel receptor 108, the top of the window panel 302 remains between the sides (e.g. 220, 222) of the upper window panel receptor 106. This is facilitated by the sides of the upper window panel receptor 106 being substantially longer/higher than the side of the lower window panel receptor.

Thus, as shown in FIG. 3C, the window arrangement is substantially the same as shown in FIG. 1. As there are no screws used to fasten the window panel to the window opening, the time to install the window is greatly reduced. The space between the vertical sides of the window panel and the window opening can be filled with backing material and then caulked over on the outside and inside. As a result, there will be a gap between the top of the window panel and the base of the upper window panel receptor, but because of the length/height of the sides of the upper window panel receptor, the top of the window panel remains captured between the sides of the upper window panel receptor.

Figure 22:
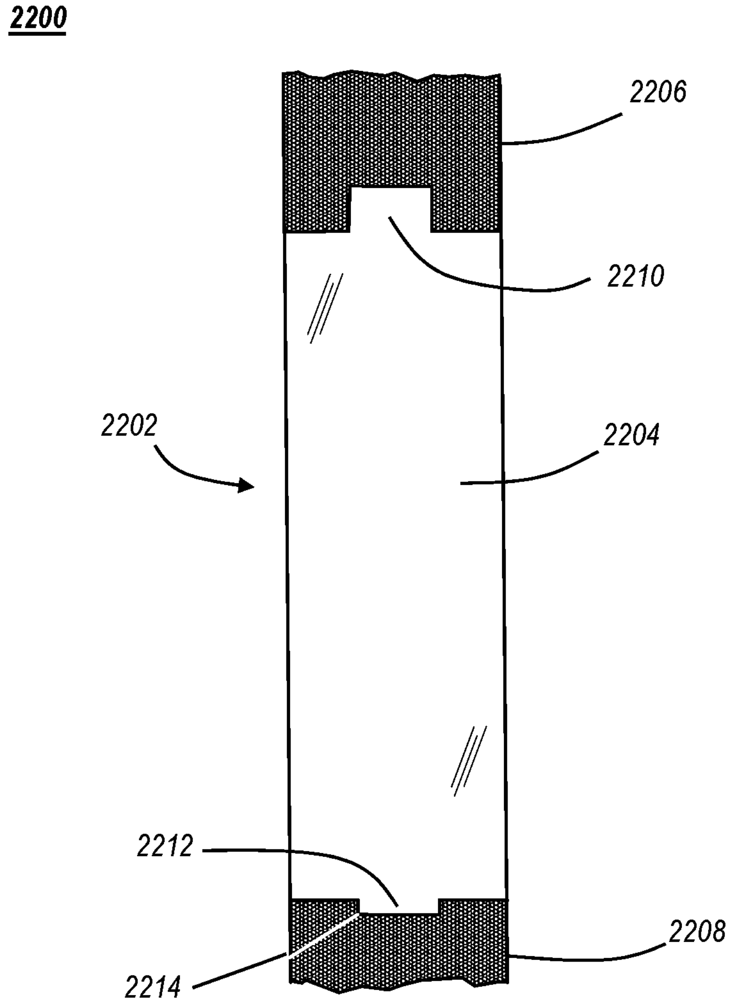
FIG. 22 show a fenestration opening having a pre-cast lintel and sill that each have a receptor formed in them, in accordance with some embodiments.

It will be appreciated by those skilled in the art that the same arrangement can be positioned side to side, as well as top to bottom. That is upper window panel receptor 106 can be positioned on a side (jamb) and lower window panel receptor 108 can be placed on the opposite side of the window opening. In such an arrangement, FIGS. 3A-3C, instead of being a side view, could be a top (or bottom) view of the process. Furthermore, it will be understood that the "U" shaped receptors, while shown here are separate elements, can be features built into the sides of the fenestration opening. For example, as shown in FIG. 22, the lintel and sill of a window opening can be constructed with opposing "U" shaped features to receive, for example, the top and bottom ends of a window panel equivalently to that shown in FIGS. 1-3C.

As used herein, the term "capture" and "captured" refers to a mechanical arrangement where something is prevented from moving in at least one dimension. Here, the top of the window panel is captured between the sides of the upper window panel receptor, which provide a mechanical barrier to horizontal movement, while still allowing vertical movement. In some contexts the terms "capture" and "captured" can refer to an element being unable to move, such as the glass pane in a window frame; the pane is captured in the frame, and prevented from moving in any direction relative to the frame, even though some frames can move (e.g. portions of the double hung window frame, a sliding glass door).

Figure 4A:
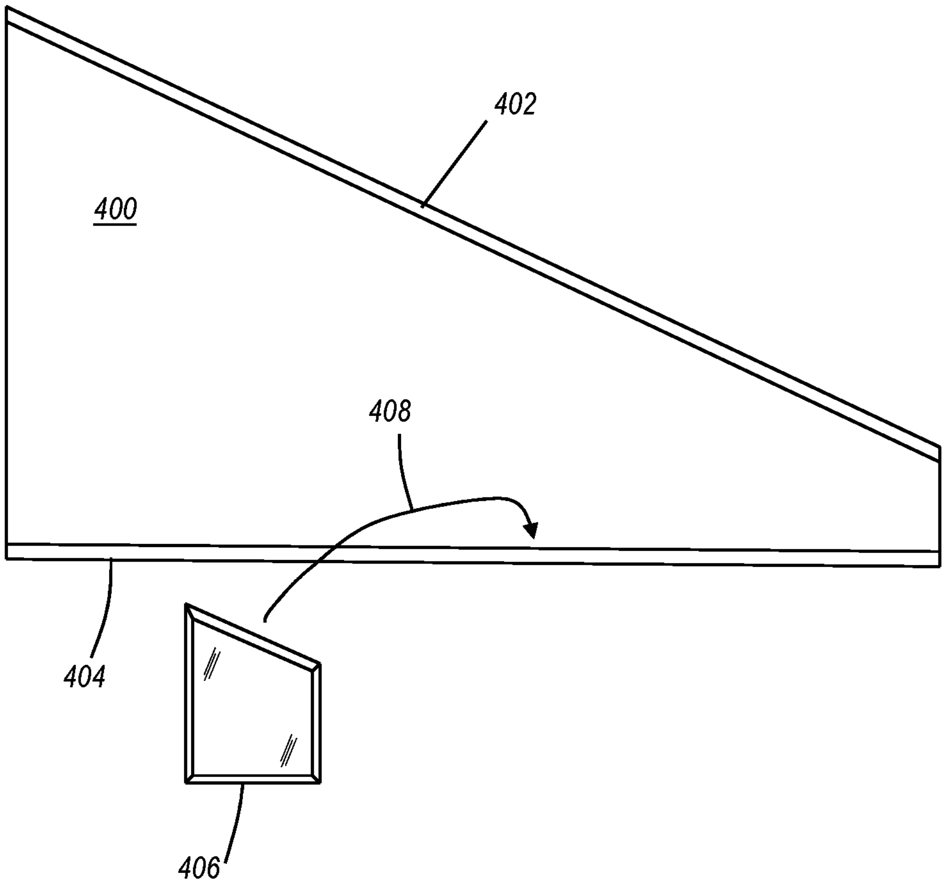
FIGS. 4A-4D shown a front elevational view of a non-rectangular window opening in which several window panels are installed, in accordance with some embodiments.
Figure 4B:
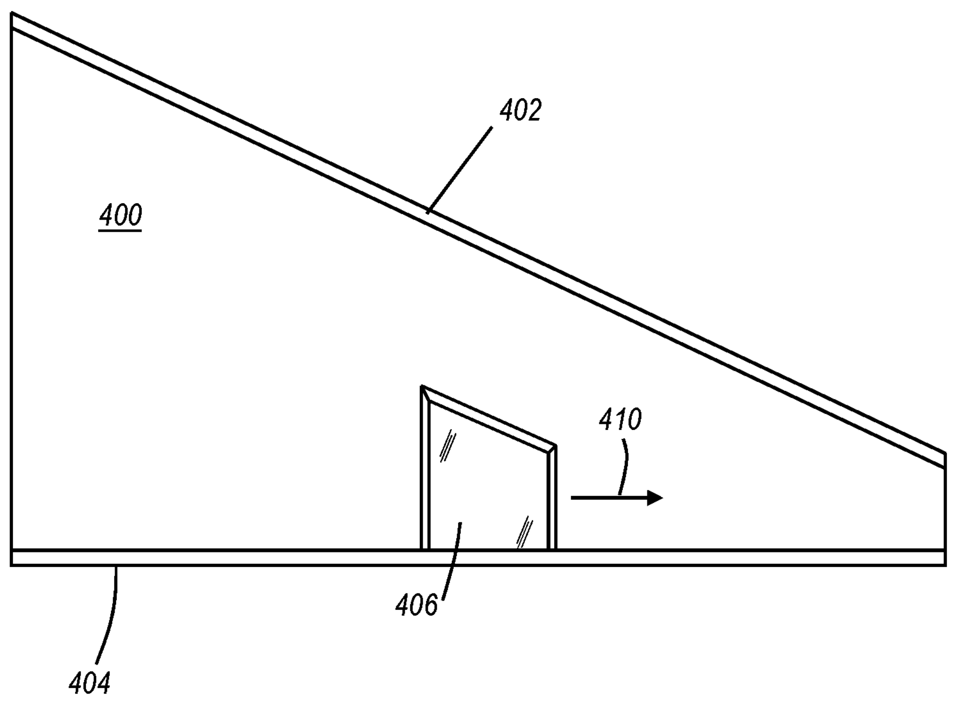
Figure 4C:
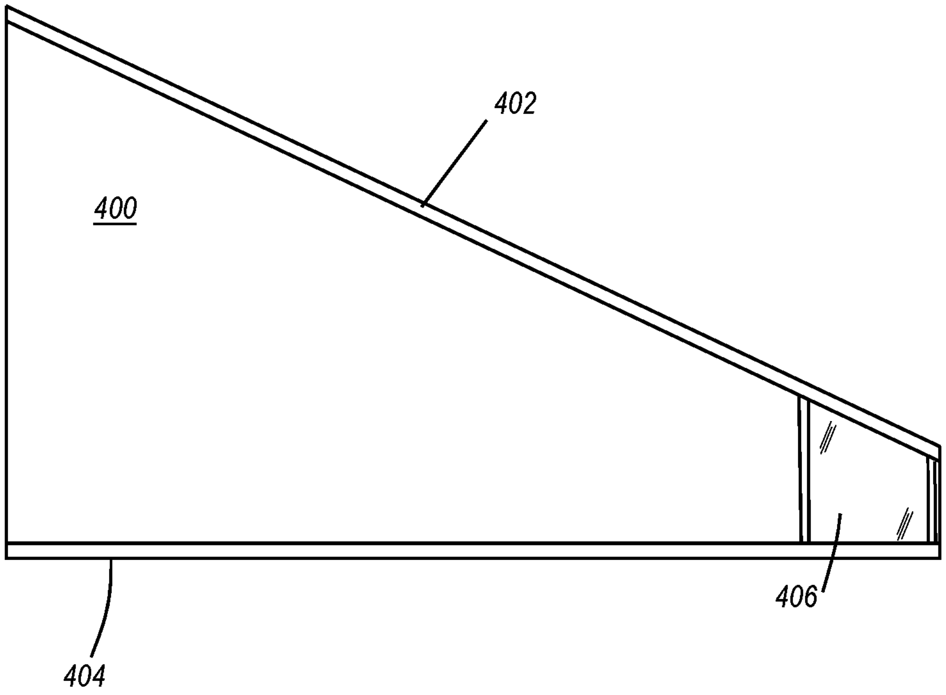
Figure 4D:
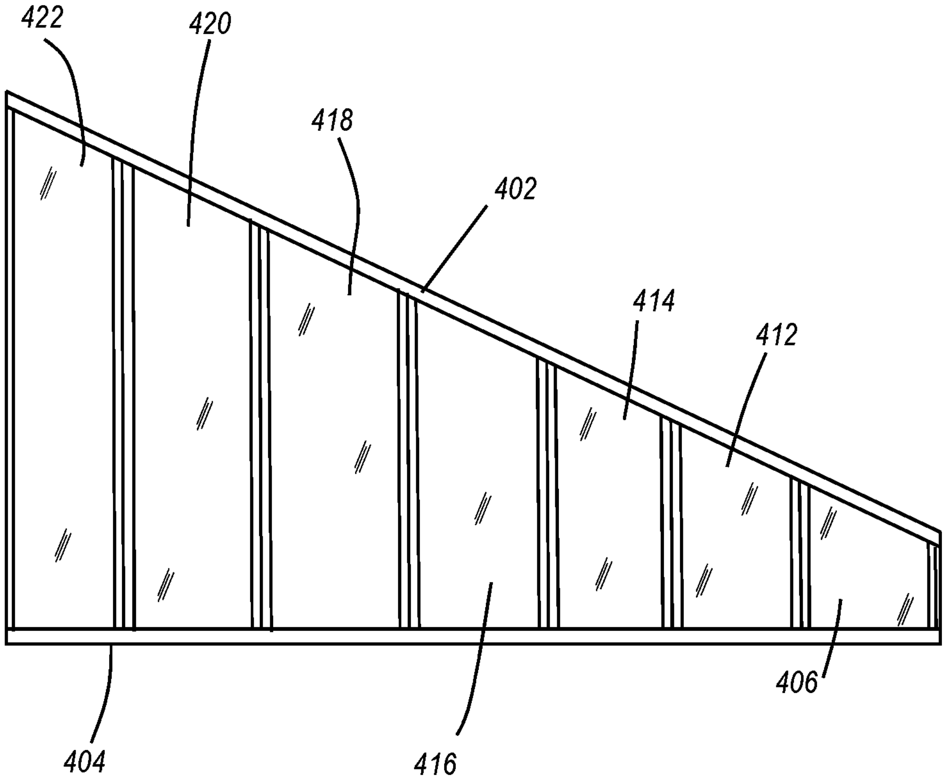

Although a rectangular window has been shown here as an example, other shapes of windows can be installed similarly. For example, the top and bottom portions of the window opening do not have to be parallel to each other. The same process and components can be used, for example, where the bottom is horizontal and the top of the window opening is at an angle to horizontal. Further, a window opening can include more than one window panel. Multiple window panels can be installed, side by side, across a window opening. In an arrangement where multiple window panels are used and the top of the window opening is at an angle to horizontal, then the smaller window panel units can be slid into position by placing them into the lower window panel receptor and sliding it over into position. This arrangement is shown in FIGS. 4A-4C. Briefly, in FIG. 4A a window opening 400 is provided with an upper window panel receptor 402 and a lower window panel receptor 404. A window panel 406 is to be installed into the window opening 400. Accordingly, the window panel 406 can be placed into to window opening 400 at a location where the window opening 400 is taller than the window panel 406, with the bottom of the window panel being inserted into the lower window panel receptor 404, as shown in FIG. 4B. Once inserted into the lower window panel receptor 404, the window panel can be slid over as indicated by arrow 410 into the position shown in FIG. 4C. Then subsequently installed window panels can similarly be installed into the window opening, with the exception of the last window panel which will be installed as shown in FIGS. 3A-3C into window opening 400 (e.g. at the far left side). The finished window installation is shown in FIG. 4D with additional window panels 412-422 installed in window opening 400.

Figure 5:
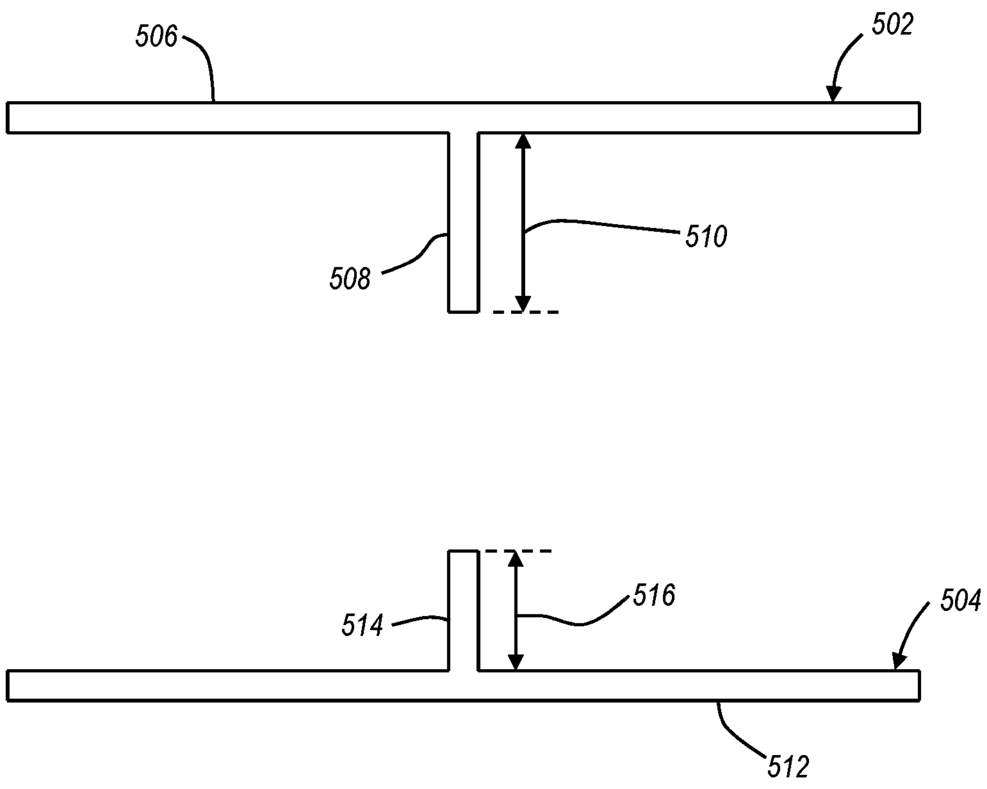
FIG. 5 shows cross sectional view of upper and lower receptors having a center panel capture feature, in accordance with some embodiments.
Figure 12:
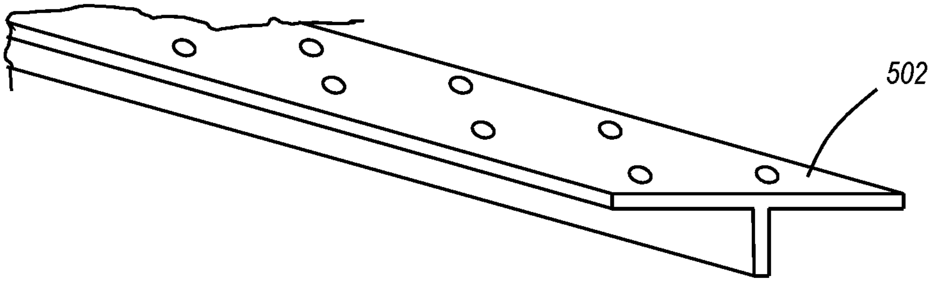
FIG. 12 shows an end perspective view of a receptor as shown in FIG. 5, in accordance with some embodiments.

FIG. 5 shows side end views of upper and lower receptors having a center panel capture feature, in accordance with some embodiments. As alternative to the arrangement of the receptors of FIGS. 1-4D, where the sides, at the outside edges of the receptor, are used to capture the window panel, in this alternate configuration one or more centrally positioned tangs or walls are used that interface with and mate into a corresponding slot in the window panel at the top and bottom of the window panel. Specifically, as shown here, there is an upper receptor 502 and a lower receptor 504. The upper receptor 502 is intended to be attached to the upper portion boundary wall portion of a window opening in a building. Likewise, the lower receptor 504 is intended to be attached to the lower boundary or sill of the window opening in correspondence with the upper receptor 502 such that they are vertically aligned. The upper receptor includes a base 506 that, from a top view is rectangular, and is flat. On the bottom of the base 506 is a centrally located wall 508 that depends from the bottom of the base 506. The wall 508 can be in the center (from left to right) or off center. The wall 508 can run the length of the base 506 (i.e. into the page), or the wall 508 can run less than the length of the base 506. The wall 508 has a height 510, which is the distance from the bottom of the base 506 to the lowermost or distal end of the wall 508. FIG. 12 shows an end perspective view of the upper receptor 502, including holes for attaching the upper receptor 502 to the top of a window opening. The lower receptor 504 has a base 512 that can be otherwise substantially the same size and shape as the base 506 of the upper receptor 502. The lower receptor 504 includes a wall 516 that extends from a central portion of the base 512 at a top of the base 512. The wall 514 has a height 516 that is less than the height 510 of wall 508 of the upper receptor 502.

Figure 6:
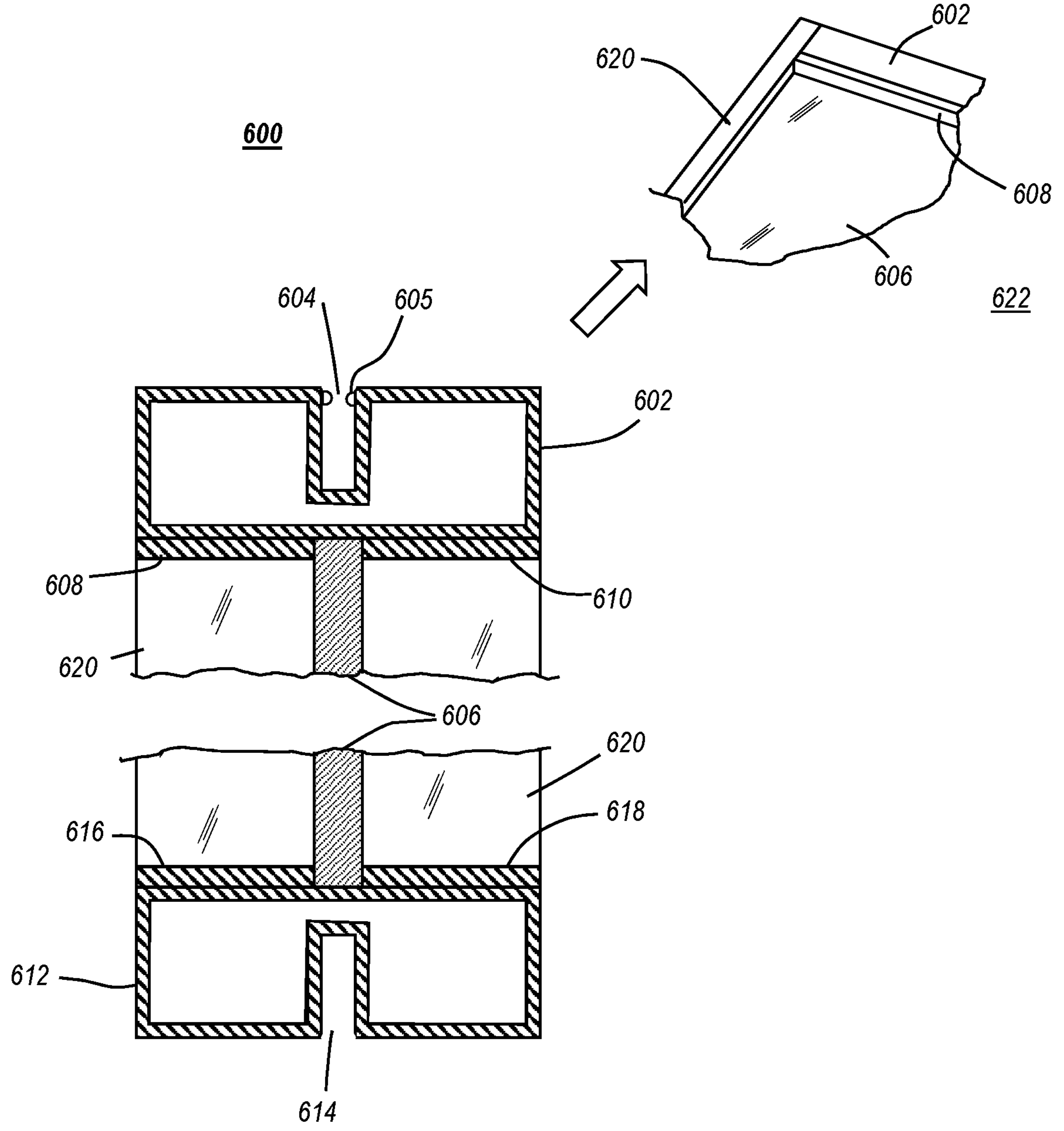
FIG. 6 shows a side view of a window panel configured to be used with the upper and lower receptors of FIG. 5, in accordance with some embodiments.

FIG. 6 shows a side view of a window panel 600 configured to be used with the upper and lower receptors 502, 504 of FIG. 5, in accordance with some embodiments. The window panel 600 is shown broken in the center to remove redundant matter. the window panel, in generally, comprises a pane of tempered impact glass laminate 606 that is transparent, and that is held and surrounded around the sides of the glass laminate 606 by extruded aluminum members. An inset 622 shows a partial cut-away perspective view of the window panel 600 for reference. A top member 602 and a bottom member couple to side members such as side member 620, and upper and lower capturing members 608, 610 and 616, 618 respectively, that fix the glass laminate 606 in the panel. Although not shown, it is well known that vinyl members can be placed between the glass laminate 606 and the metal members (e.g. 602, 604, 608, 610, 616, 618, and 620) to prevent metal to glass contact and provide a water/weather seal. As can be seen the top member 602 includes top notch 604 that is generally centrally located along the top member 602 and creates a space or gap that extends from the top of the top member 602 into the top member 602. Similarly, the bottom member 612 has a similar notch 614 formed in the bottom of the bottom member 612. Notch 604 is sized to receive wall 508, and notch 614 is sized to receive wall 514.

Figure 7:
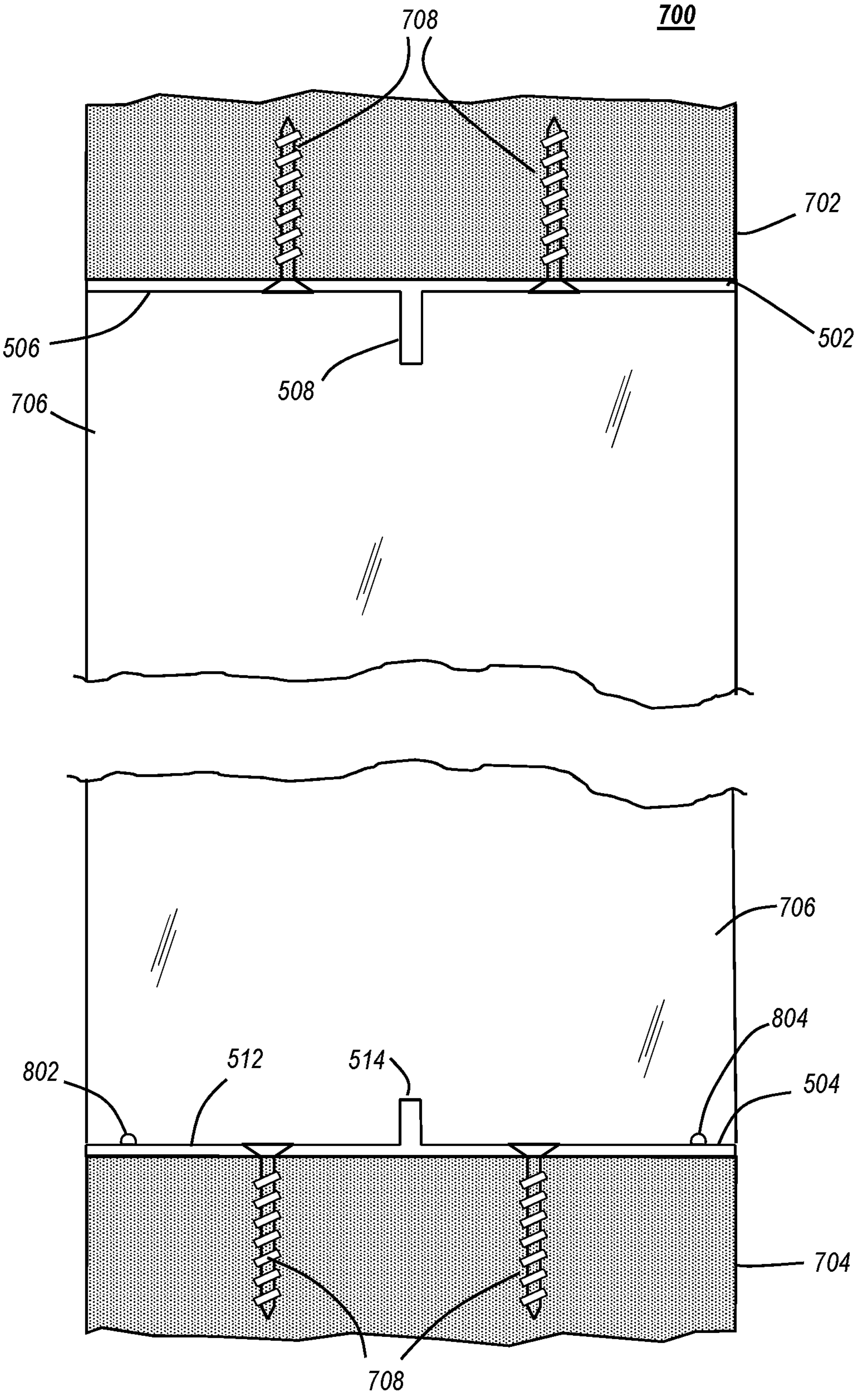
FIG. 7 shows a side cross cut view of window opening with the upper and lower window panel receptors installed, and prior to the window panel being installed, wherein the upper and lower window panel receptors have a central tang, in accordance with some embodiments.

When installing the upper and lower receptors 502, 504 in a window opening, the upper and lower receptors have to be positioned, vertically, relative to each other such that a window panel installed between them is vertically oriented, as is shown in FIG. 7. The installation is substantially similar to that shown in FIGS. 3A-3C. After the upper and lower receptors 502, 504 are installed, a window panel configured to mount on, and be captured by, the upper and lower receptors 502, 502, is raised into the window opening at a slight angle so that the top member 602 can engage the upper receptor 502 such that wall 508 enters into notch 604. Then the bottom of the panel, and specifically bottom member 612, can be swung over lower receptor 504 until notch 614 is over wall 514, and then the window panel can be lowered such that the bottom of bottom member 612 sits on base 512 of the lower receptor, but wall 508 will still be partially in notch 604, thereby capturing the window panel between the upper and lower receptors 502, 504. Notch 604 can have a compressible lining 605 on each side of the vertical walls of the notch 604 that compress as the window panel 600 is raised into place, and retain contact with the wall 508 to prevent water intrusion. Once the window panel 600 is in place between the upper and lower receptors 502, 504, there will be a gap between the top of top member 602 and the base 506 of the upper receptor that can be sealed and caulked.

FIG. 7 shows a side cross cut view of window opening 700 with the upper and lower receptors 502, 504 installed, and prior to the window panel being installed, wherein the upper and lower receptors 504, 506 each have a central wall 508, 514, respectively, in accordance with some embodiments. The upper receptor 502 can be held in place in the top wall 702 bordering the window opening with fasteners such as screws 708. There can be rows of screws along the length of the upper receptor, which extends into and out of the page (see, e.g., FIG. 12). Likewise, the lower receptor 504 can be attached to the sill 704 by fasteners such as screws 708. The jamb 706 form the side of the window opening. Window panel 600 can be inserted into the window opening by aligning notch 604 with wall 508, and lifting the window panel such that wall 508 extends into notch 604 sufficient such that the bottom member 612 can be swung over wall 514 of the lower receptor until the wall 514 is aligned with notch 614 of the bottom member 612 of the window panel 600, wherein the window panel 600 can be lowered such that the bottom of bottom member 612 rests on the base 512 of the lower receptor, and the wall 514 of the lower receptor is captured in the notch 614 of the bottom member 612 of the window panel 600. However, since wall 508 extends further from the base 506 of the upper receptor 502 than wall 514 extends from the base 512 of the lower receptor 504, the wall 508 of the upper receptor will remain partially captured in notch 604 of the top member 602 of the window panel. As a result, the window panel 600 is then secured at the top and bottom. The upper and lower receptors 106, 108 and 502, 504 can be secured well enough in the structure that additional fasteners are not needed at the sides, between the jamb and the window panel. Only weather sealing is necessary on the sides. Weather seals such as vinyl strips 802 can be present on the base 512 of the lower receptor, which are compressed to form a water tight seal between the top of the base 512 and the bottom of the bottom member 612.

Figure 8:
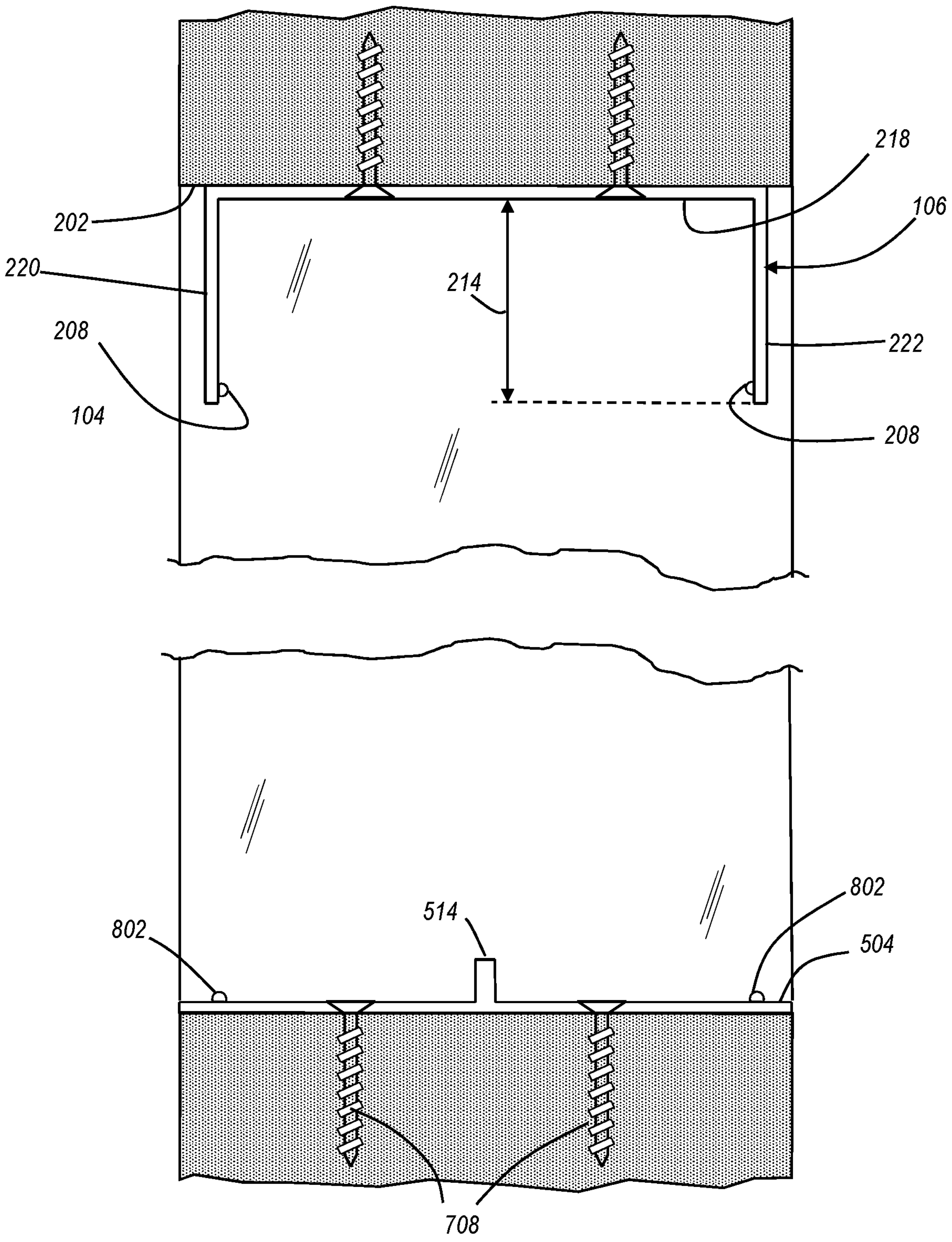
FIG. 8 side cross cut view of window opening with the upper and lower window panel receptors installed, and prior to the window panel being installed, using a mix of receptor styles, in accordance with some embodiments.

FIG. 8 side cross cut view of window opening 800 with the upper and lower window panel receptors installed, and prior to the window panel being installed, using a mix of receptor styles, in accordance with some embodiments. Specifically, the arrangement used here shows a combination of using upper receptor 106 that is "U"-shaped as in FIG. 2, with lower receptor 504, as in FIG. 7, which has the central wall 514 or lengthwise ridge. The principle remains the same; the upper receptor 106 has a "capture length" of the sides 220, 222 that is taller in distance 214 that the height of wall 514. This allows the top of a window panel to be inserted into the upper receptor 106 such that the bottom of the window panel can pass over the wall 514. A window panel for use with this arrangement would have a top member that is wide enough allow the top of the window panel to be raised into the upper receptor, but not so narrow as to not compress weather stripping members 208.

Figure 13:
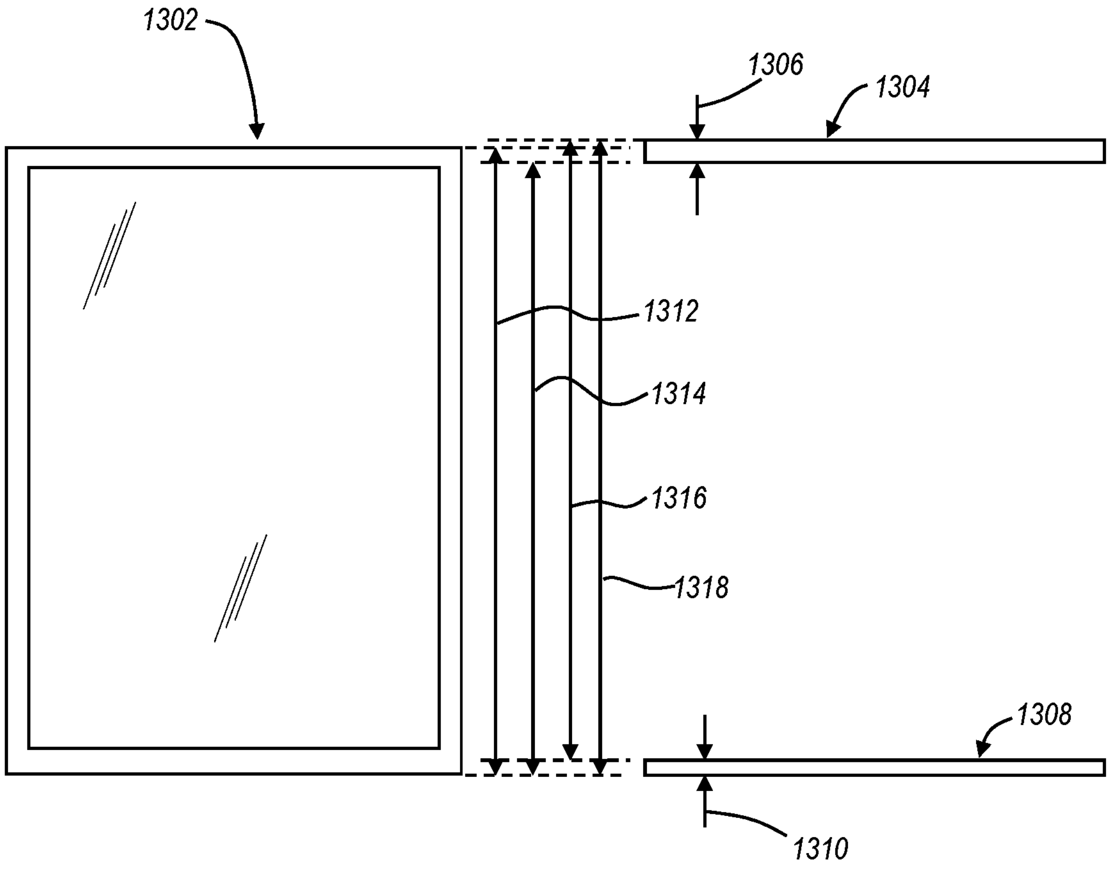
FIG. 13 is a dimensional diagram showing the dimensional relationships between the window panel and the receptors, and between the receptors, in order for the window panel to be able to be inserted between the receptors and to be thereafter captured by the receptors.

As shown in FIG. 13, a window panel 1302 has a height 1312. The height 1312 of the window panel 1302 is less than the distance 1318 between the upper and lower receptors 1304, 1308, meaning specifically the distance between the bottom of the base of the upper receptor 1304 and the top of the base of the lower receptor 1308. Further, the height 1312 of the window panel 1302 is also less than the distance 1316 between the top of the wall or sides of the lower receptor 1308 and the base of the upper receptor 1304 facing the lower receptor 1308. However, the height 1312 of the window panel 1302 is more than the distance 1314 between the bottom of the wall or sides of the upper receptor 1304 and the base of the lower receptor 1308 on which the window panel 1302 will rest. So long as these dimensional relationships are satisfied, the window panel 1302 can be raised into position between the upper and lower receptor 1304, 1308, swung over the bottom receptor 1308, and then lowered onto the lower receptor 1308 such that the top of the window panel 1302 is captured by the upper receptor 1304.

Figure 9:
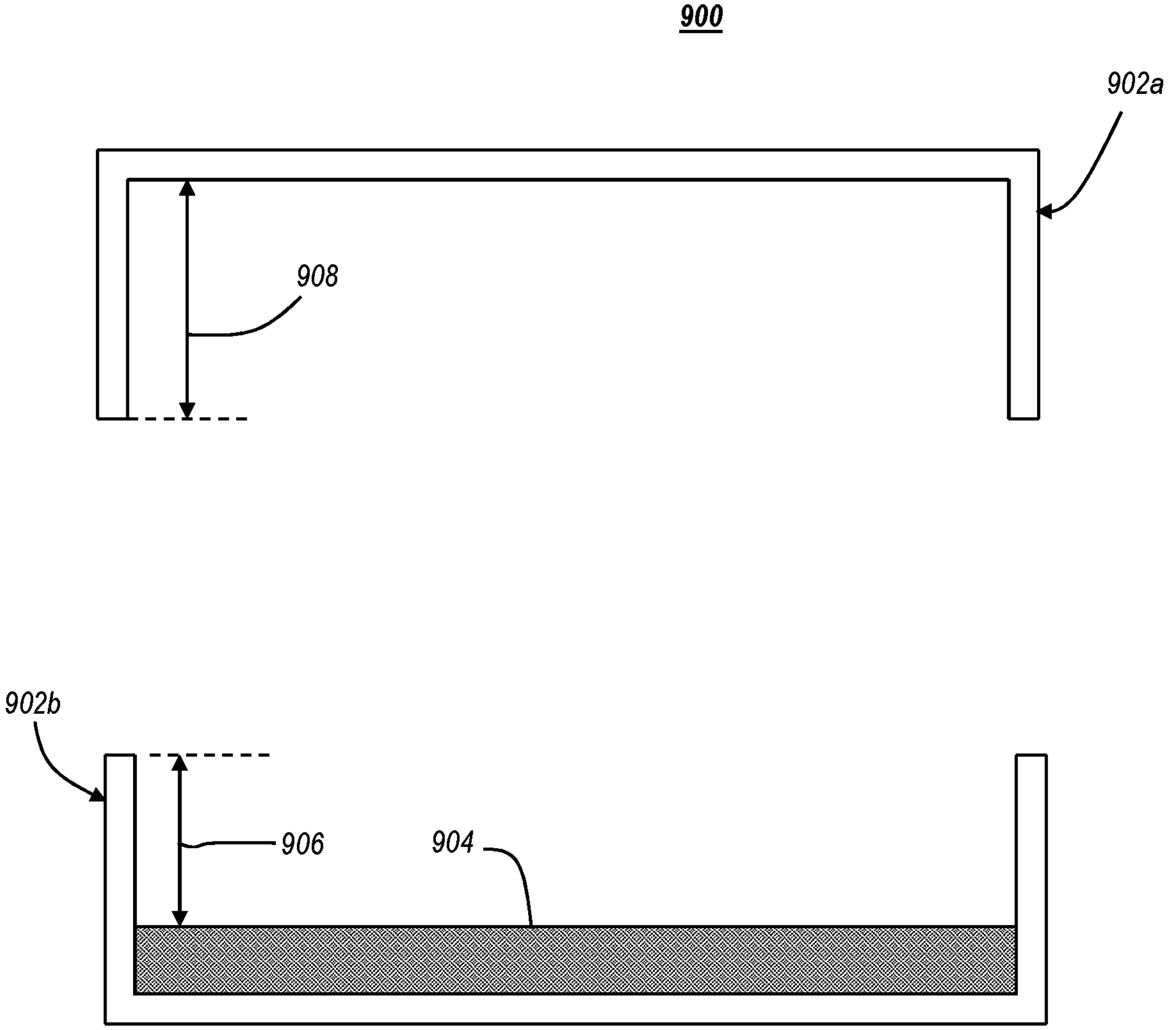
FIG. 9 shows an end-view of a pair of opposing window receptors having substantially identical dimensions, and wherein the window receptor used as the lower window receptor includes a spacer to reduce the effective height in the receptor, in accordance with some embodiments.

FIG. 9 shows an end-view 900 of a pair of opposing window receptors **902*a*, 902*b* having substantially identical dimensions, and wherein the window receptor 902*b* used as the lower window receptor includes a spacer 904 to reduce the effective height 906 in the receptor, in accordance with some embodiments. Upon inserting a window panel between the upper and lower receptors 902*a*, 902*b*, the bottom of the window panel will rest on the spacer 904. The presence of the spacer reduces the effective height of the lower receptor 902*b* from that of 908 to 906, which is less than height 908. Thus, the spacer 904 effectively lowers the capture height of the lower receptor 902*b***. This allows the use of only one receptor, which reduces the inventory and supply chain needs such that only one receptor dimension is needed, and an inexpensive spacer can be used to create the lower receptor.

In general, the window receptors, or simply receptors, have a capture feature that engages with a corresponding feature of the window panel to prevent movement in or out of the window opening. The capture feature can be, for example, the sides 220, 222 of upper receptor 106 or sides 226, 228 of lower receptor 108, which engage the sides of the top and bottom frame members of a window panel. The central wall 508 of receptor 502 is a capture feature that engages notch 604. These elements can be equivalently reversed such that the capture feature of a receptor is a notch which engages a wall or tang extending from the corresponding end of a window panel. The capture features can be mixed such that the opposing receptors have different capture features. The inventive embodiments only require that a maximum distance between the opposing receptors (e.g. base to base) is greater than the end to end distance across the window frame, and that the distance between the capture features of the opposing receptors, at their closest points across the window opening, is less than the distance across the window frame in a direction between the opposing receptors. This relationship applies whether the receptors are mounted in the top and bottom of the window opening, or on the vertical sides of the window opening.

Figure 10:
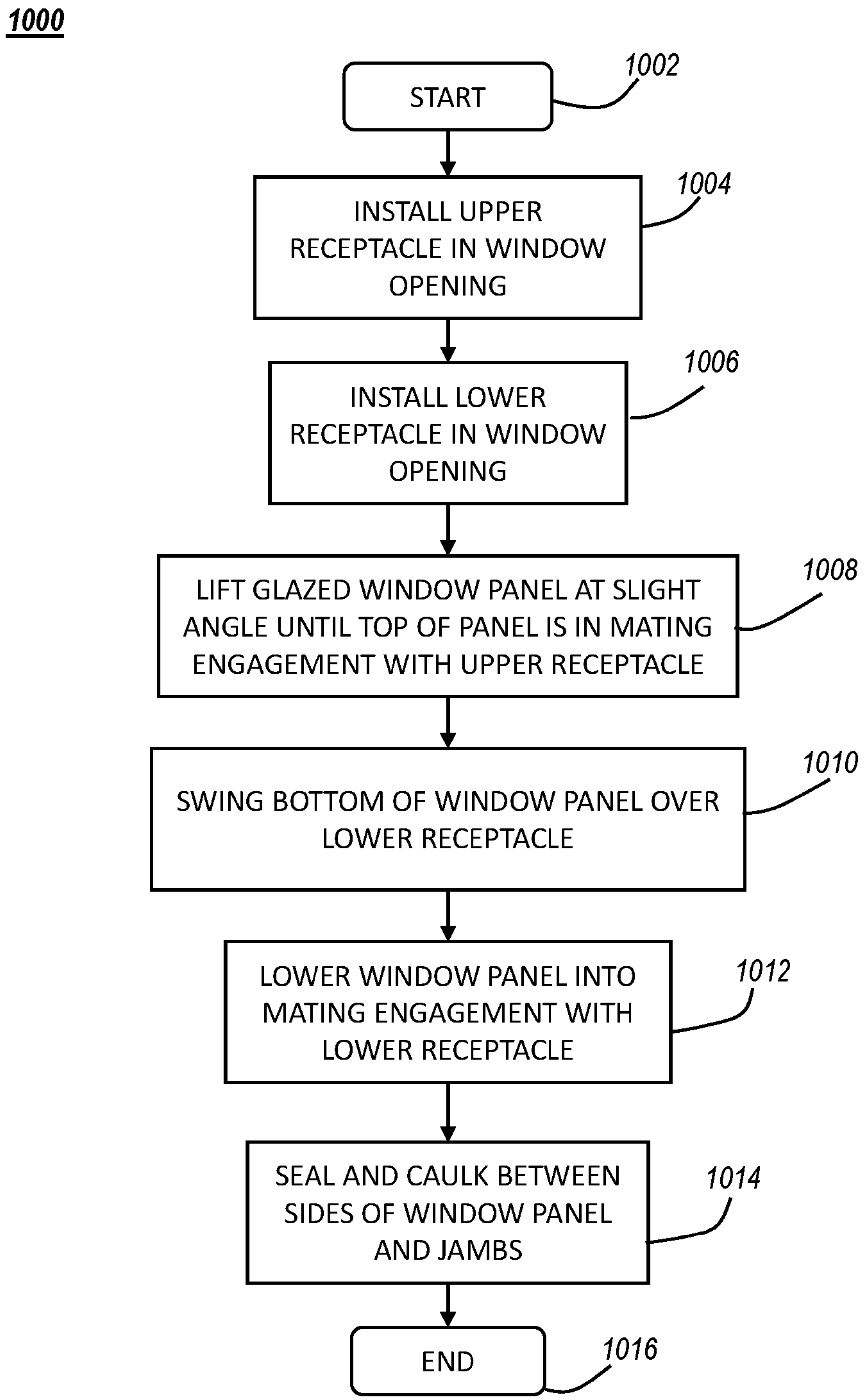
FIG. 10 is a flow chart diagram of a method for installing window panels in building, in accordance with some embodiments.
Figure 11:
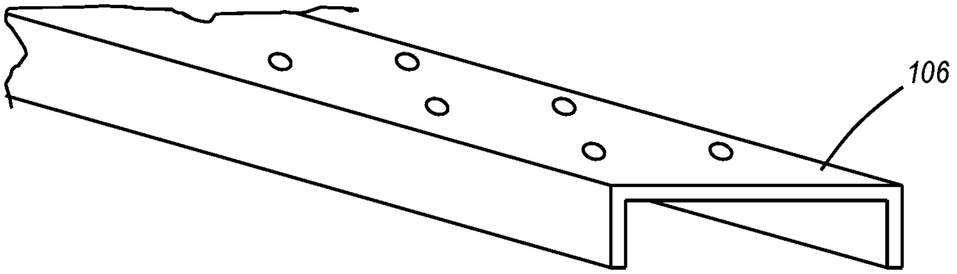
FIG. 11 shows an end perspective view of a receptor as shown in FIG. 2, in accordance with some embodiments.

FIG. 10 is a flow chart diagram of a method 1000 for installing window panels in building, in accordance with some embodiments. The method 1000 applies equally to other products, such as, for example, sliding glass doors, that was contained in a panel assembly. Thus, a window panel is an assembly of glass pane products contained in a frame of, typically, extruded aluminum or equivalent members. Prior to the present invention, window panels have been attached to receptors using fasteners. The present invention, however, eliminates the need to join the window panel to the receptors. The method 1000 starts 1002 by providing upper and lower receptors that are sized, lengthwise to the width or distance across the top and bottom of a window opening. The window receptors each have differing capture heights; the lower receptor will have a lower/shorter capture height than the upper receptor. The window panel that is to be installed in the receptors is sized according to the dimensional relationships shown in FIG. 13. In steps 1004, 1006 the upper and lower receptors are installed in the window opening. The upper receptor is attached to the wall structure at the top of the window opening and the lower receptor is attached to the wall structure (e.g. the sill) at the bottom of the window opening. The upper and lower receptors are vertically aligned to capture the window panel between them. In step 1008 the window panel is raised in a substantially vertical position, but at a slight angle to vertical such that the top of the window panel is matingly engaged with the upper receptor. The top of the window panel is raised into engagement with the upper receptor higher than it will sit at the end of the method so that the bottom of the window panel can, in step 1010, be moved over the lower receptor. Then in step 1012, the window panel is lowered into mating engagement with the lower receptor. So long as the dimensional relationships of FIG. 13 are met, the top of the window panel will remain captured by the upper receptor. The in step 1014 the gaps between the vertical sides of the window panel and walls structure at the sides of the window opening can be sealed and caulked, and the method is then complete 1016.

Figure 14:
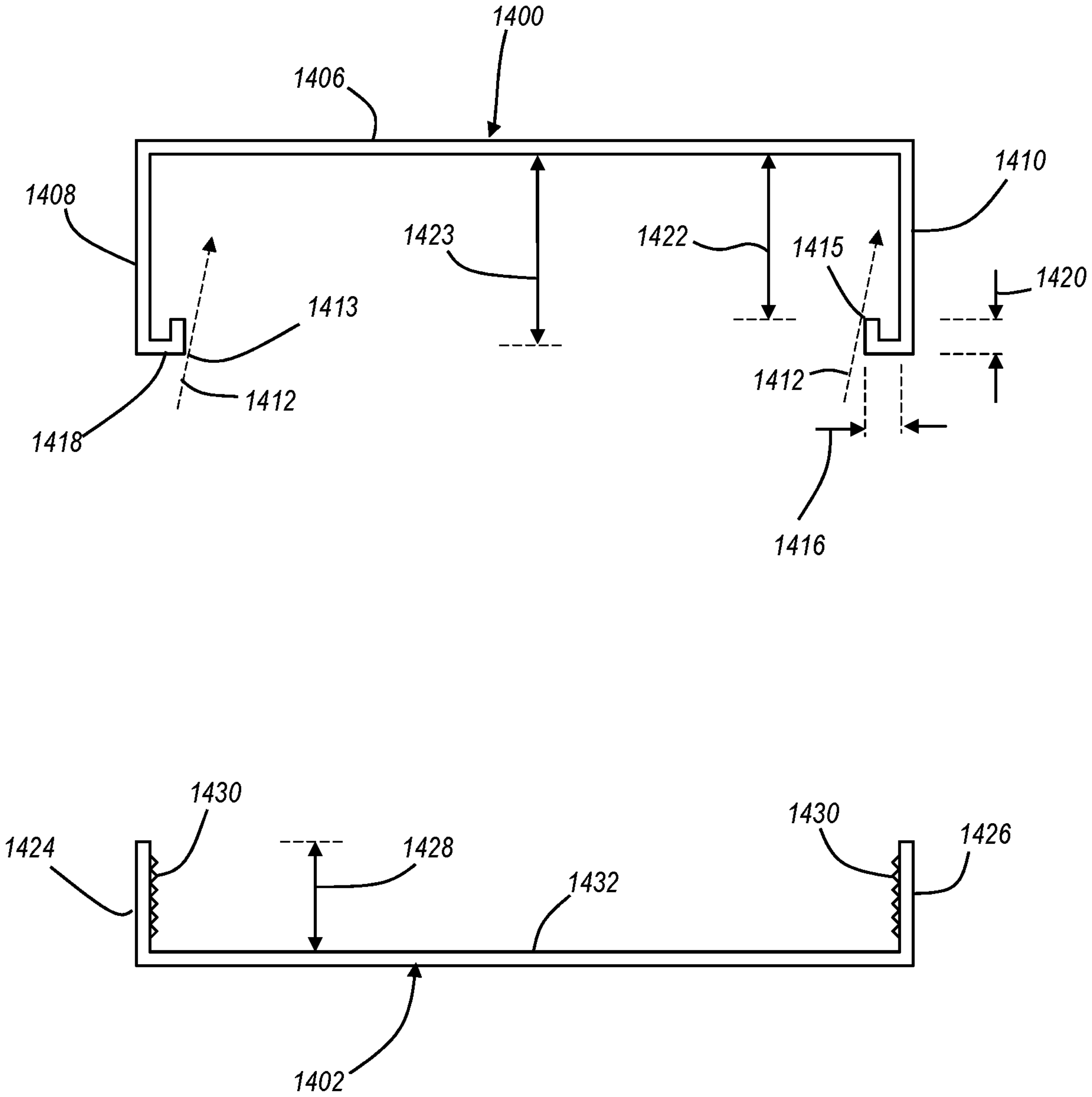
FIG. 14 shows an end view of end view of receptors including an upper receptor and a lower receptor for receiving vinyl-framed window panels, in accordance with some embodiments.

FIG. 14 shows an end view of end view of receptors including an upper receptor 1400 and a lower receptor 1402 for receiving vinyl-framed window panels, in accordance with some embodiments. Similar to the receptors previously shown and described, upper receptor 1400 and lower receptor 1402 are used together to capture a window panel in an installation, and to hold the window panel in place permanently. The receptors 1400, 1402 are sized to allow an appropriately sized window panel to be lifted into the upper receptor 1400 at a slight angle such that the top of the window panel is in the receptor 1400, whereupon the lower end of the window panel is moved over the lower receptor 1402 and then the window panel is lowered into the lower receptor 1402.

The upper receptor 1400 has a base 1406 and opposing walls 1408, 1410 that extend from the long sides of the base 1406 and have a height indicated by arrow 1423. The bottom 1418 of each of the walls 1408, 1410 include and offset portion that turns inward toward the opposing wall a distance indicated by arrows 1416, and upward a height indicated by arrows 1420. These bottom features create the offset portion that is offset from the inner side of the walls 1408, 1410 and allow the top of a window panel to be inserted at an angle indicated by lines 1412. Upon being inserted, the window panel, if inserted as indicated by lines 1412, will be closest to the bottom inner edge 1413 of the offset portion of wall 1408, and the upper inner edge 1415 of offset portion of the wall 1410, which is slightly more distance then the distance directly across, horizontally, between corresponding points on the two walls 1408, 1410. When the window panel is sufficiently inserted between the walls 1408, 1410, the inner faces of the bottoms 1418 of the walls 1408, 1410 will bear against the sides of the upper frame member of the window panel, which can be made of vinyl. The design of the upper receptor 1400 obviates the need for a vinyl bead on the inside of walls 1408, 1410 as a weather seal.

Figure 15:
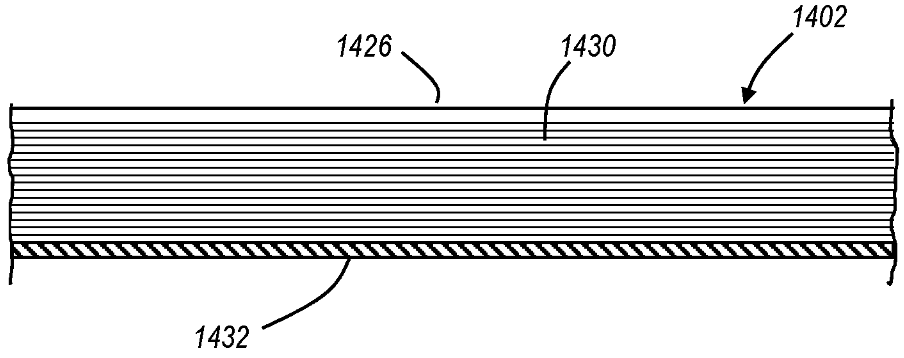
FIG. 15 shows an elevational view of the inside of a lower receptor as shown in FIG. 14, in accordance with some embodiments.
Figure 16:
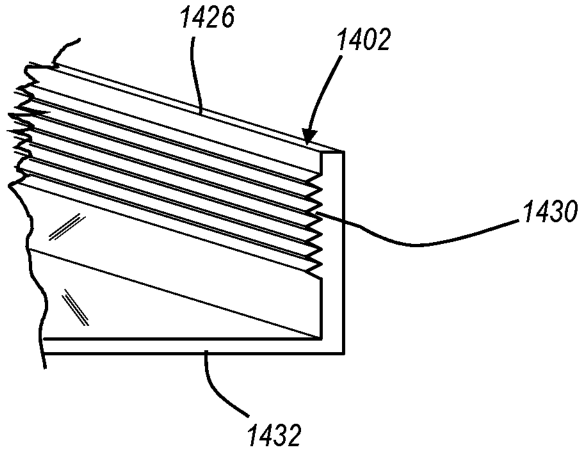
FIG. 16 shows a partial end perspective view of a lower receptor as shown in FIG. 14, in accordance with some embodiments.

The lower receptor 1402 likewise includes a base 1432 and has opposing walls 1424, 1426 that extend a height 1428 that is less than the height 1423 of the walls 1408, 1410 of the upper receptor 1400. The height difference allows for the sizing of the window panel to ensure it remains captured in the upper receptor 1400 when the window panel is seated in the lower receptor 1402. The width between the inside of the walls 1424, 1426 can be about the same as the width or distance between the bottom inner edges 1413 of the bottoms of the walls 1408, 1410 of the upper receptor 1400 since the bottom of the window panel does not have to be angled into the lower receptor 1402. On the inside surfaces of the walls 1424, 1426 of the lower receptor 1402 are linear ridges 1430 that extend horizontally along the walls. The ridges 1430 are designed to engage the bottom of the window panel frame and provide a weather seal in embodiments where the window panel frame is made of vinyl. FIG. 15 shows an elevational view of the inside of a lower receptor 1402, and FIG. 16 shows a partial end perspective view of a lower receptor 1402. In FIG. 15 the base 1432 is cut to show the ridges 1430. As shown here the ridges 1430 have a triangular profile, but can be shaped differently and achieve a similar effect.

Figure 17:
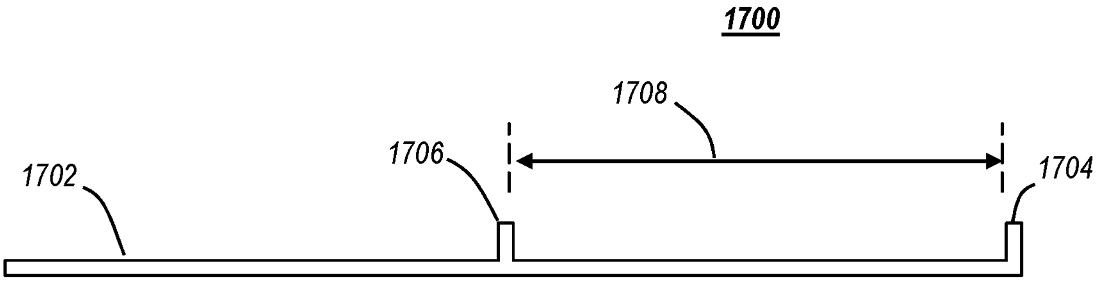
FIG. 17 shows a side view of a panel stabilizer for a window panel installed between a pair of receptors, in accordance with some embodiments.
Figure 18A:
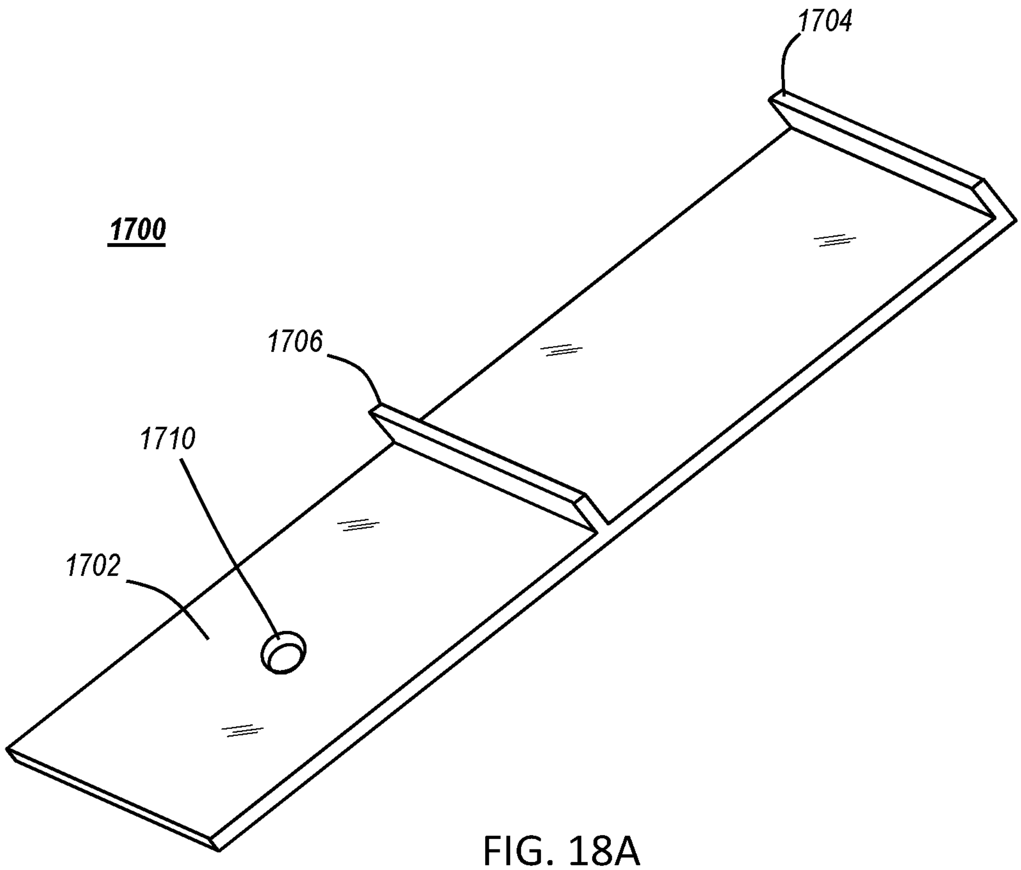
FIG. 18A shows a perspective view of a panel stabilizer for a window panel installed between a pair of receptors, in accordance with some embodiments.

FIG. 17 shows a side view of a panel stabilizer 1700 for a window panel installed between a pair of receptors, and FIG. 18A shows a perspective view of the panel stabilizer 1700. Since window panels experience pressure resulting from wind, it is expected that larger window panels that are captured between opposing receptors may experience a significant amount of bowing at the middle of the panel in response to high winds. This is of concern particularly in multistory buildings such as hotels, office buildings, and high rise residential buildings where the upper floors may not be shielded from wind. To prevent bowing, a pair of panel stabilizers such as stabilizer 1700 can be used to anchor the mid-section of the window panel in the window opening. The stabilizer 1700 includes a base 1702 from which a pair of catch features 1704, 1706 extend from. The catch features 1704, 1706 provide flat faces that are perpendicular to the base 1702 that are separated by a width 1708 that is sized to receive a side frame member of a window panel. That is, width 1708 is sized to be just large enough to fit over the side member of a window panel frame. Different sized side frame members will require correspondingly sized stabilizers. The end catch feature 1704 can be fixed to the base 1702 at a distal end of the base 1702, and will be on the outside of the window panel upon installation of the window panel. The inside catch feature 1706 extends from the base 1702 in a more central position on the base 1702, and will be positioned on the inside of the window panel when installed.

Figure 19:
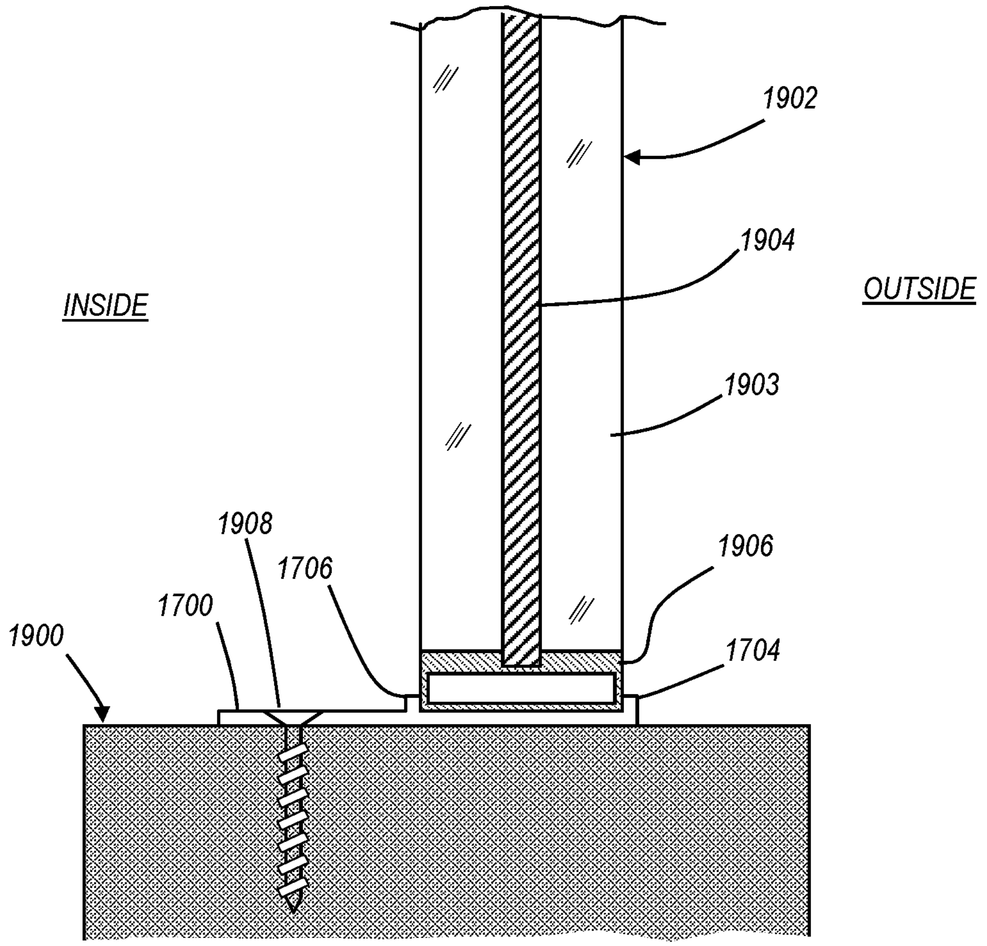
FIG. 19 shows a partial top cross-sectioned view of a window panel installed with a panel stabilizer, in accordance with some embodiments.

The panel stabilizer 1700 is placed over the side frame member (e.g. 2109, 2110) of a window panel such that the side frame member fits between the catch features 1704, 1706 and against the base 1702 between the catch features 1704, 1706. When installed, the stabilizer 1700 will be between the window panel and the jamb, and the stabilizer can be screwed into place by installing a screw through screw opening 1710. FIG. 19 shows a partial top cross-sectioned view of a window panel 1902 installed with a panel stabilizer 1700, in accordance with some embodiments. The window panel 1902 can be substantially similar to window panel 2100 of FIG. 21, and includes one or more glass panes 1904, a bottom frame member 1903, and a side frame member 1906. The side frame member fits between the catch features 1704, 1706, and the stabilizer 1700 is secured to the jamb of the wall 1900 with a screw 1908 that passes through a screw hole in the stabilizer 1700. A corresponding stabilizer is likewise installed on the opposite side of the window panel to the opposite jamb.

Figure 20:
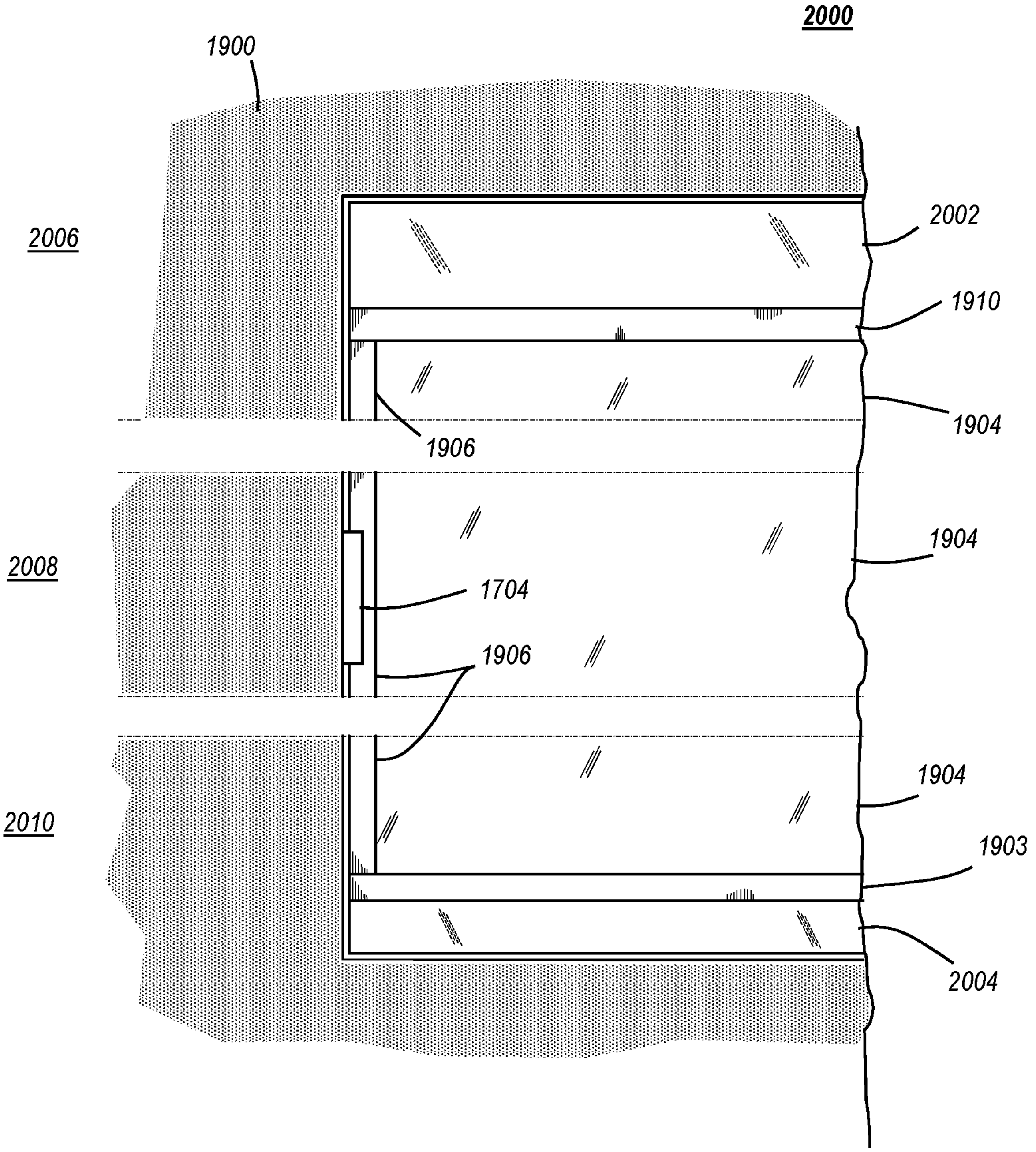
FIG. 20 shows a segmented elevational view of a window panel installed with a panel stabilizer, between receptors, in accordance with some embodiments.

FIG. 20 shows a segmented elevational view, from the outside, of the window panel of FIG. 19 installed with a panel stabilizer, between receptors in accordance with some embodiments. A wall 1900 includes an opening into which a window panel is installed and secured using a panel stabilizer. The view has been segmented to show the top portion 2006, a middle portion 2008, and a bottom portion 2010 of the assembly, with the interim portions removed in order to show the details. An upper receptor 2002 is installed along the top of the window opening, and a lower receptor 2004 is installed along the bottom of the window opening on the sill. The upper frame member 1910 of the window panel is captured in the upper receptor 2002, and the lower frame member 1903 of the window panel is captured in the lower receptor 2004, using, for example, the process of FIGS. 3A-3C. The side frame member 1906 forms the vertical side of the window panel between the top frame member 1910 and the lower frame member 1906, and the glass pane or panes 1906 are captured in the frame formed by the frame members 1903, 1906, 1910 (and the opposite side frame member not shown here). The end catch feature 1704 of the stabilizer can be seen on the outside of the side frame member 1906. The opposing catch feature 1706 is on the inside of the side frame member. When wind is incident on the window panel, the stabilizer prevents the window frame from bowing due to wind pressure. As wind exerts pressure on the window, catch feature 1706 bears against the inside of the side frame member 1906 to prevent inward movement of the window frame at the side of the window frame. A corresponding stabilizer installed on the opposite side of the window panel likewise prevent movement/deflection of the window frame. Similarly, the window is prevented from bowing outward due to catch feature 1704 of the stabilizer when the window is subjected to a low external pressure.

Figure 18B:
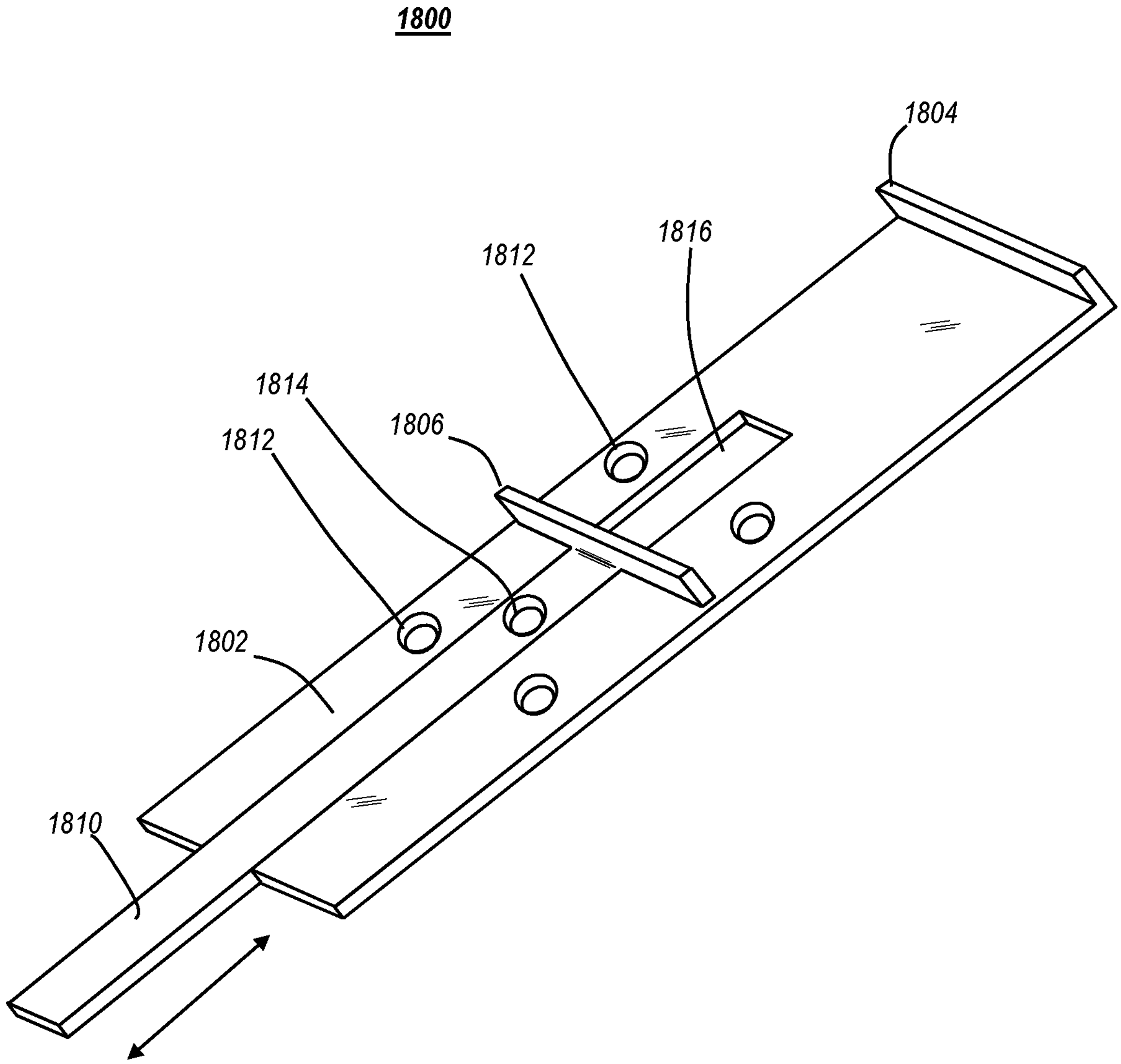
FIG. 18B shows and adjustable panel stabilizer for a range of window panels of different side member widths, in accordance with some embodiments.

FIG. 18B shows an arrangement of a stabilizer 1800 that can be used with a variety of side frame member widths, in accordance with some embodiments. The stabilizer 1800 includes a base 1802 having an outside catch feature 1804 at a distal end of the base 1802. The base 1802 further includes a slot 1816 in which a sliding tang 1810 sits, which can be moved along the slot 1816. A moveable catch feature 1806 is attached to the tang 1810 and can be moved in order to accommodate a variety of sizes of window frame side members. In installation, the base 1802 is positioned on the side of a window panel. In fact, the base 1802 can be placed into position after the window panel is installed between the upper and lower receptors by sliding the base between the window panel and the jamb with the catch feature 1804 on the outside of the window panel. Once in place, the base can be secured to the jamb by placing screws into screw holes 1812. Once the base 1802 is secured, then the tang 1810 can be placed in the slot 1816 and positioned so that catch feature 1806 bears against the inside of the window panel side frame member, whereupon the tang can then secured in place by installing a screw through screw hole 1814 on the tang 1810.

FIG. 22 show a side cut-away view of a wall 2200 in which a fenestration opening 2202 is formed and provided with pre-cast lintel 2206 and sill 2208 members. The jamb 2204 is forms the side of the fenestration opening 2202. The lintel 2206 and sill 2208 members can be pre-cast of a concrete or similar compound and mounted in place to form the top and bottom of the fenestration opening 2202. The lintel 2206 includes a receptor channel 2210, and the sill 2208 includes a receptor channel 2212. The depth or height of the lintel receptor channel 2210 is greater than that of the sill receptor channel 2212. As such the pre-cast lintel 2206 and sill 2208 are functionally equivalent to the upper and lower receptors 106, 108 of FIGS. 1-3C. The sill 2208 can be cast to include weep channels 2214 to allow any water that may overcome weather sealing measures (e.g. caulk) from entering the structure. The widths of the lintel and sill receptor channels 2210, 2212 can be sized to receive the top and bottom ends of a glazed panel, which is inserted using the a similar method as that shown in FIGS. 3A-3C.

A glazed panel installation system and method, has been disclosed that substantially reduces the time needed to install glazed panels. The system uses receptors that are attached opposite sides of a fenestration opening which capture a glazed panel in place without the need to attach the glazed panel to the walls or sills forming the fenestration opening. This allows an advance crew to install the receptors in the fenestration openings first, prior to the glazed panels arriving on site. The number of people needed to install receptors is smaller than the number of people needed to install glazed panels in the conventional manner, where each glazed panel is lifted into place, secured with fasteners, and then inspected, and finally to have to screw covers put in place. Instead, the inventive disclosure allows glazed panels to be put in place in relatively rapid succession without the need for fastener inspection because no additional fasteners are used when the glazed panels are installed. Furthermore, because the glazed panel is not directly coupled to the building structure, the effects of vibrations experienced by the building structure are less evident at the glass due to the floating of the window panel between the receptors.

What is claimed is:

1. A system for installing a glazed panel in a fenestration opening, comprising:

a first receptor fixedly mounted on a first side of the fenestration opening and which spans a width of the first side of the fenestration opening, the first receptor being configured to receive a first end of the glazed panel and having a first base and a first capture feature that extends from the first base, a first capture distance being defined between a distal end of the first capture feature, that is furthest from the first base, and the first base;

a second receptor fixedly mounted on a second side of the fenestration opening opposite the first side of the fenestration opening and which spans a width of the second side of the fenestration opening, the second receptor being configured to receive a second end of the glazed panel and having a second base and a second capture feature that extends from the second base, a second capture distance being defined between a distal end of the second capture feature, that is furthest from the second base, and the second base;

wherein the first capture distance is greater than the second capture distance, and wherein the first receptor and the second receptor are oriented to hold the glazed panel in a vertical orientation and wherein the first receptor and the second receptor are configured to hold the glazed window panel fixed in place upon the glazed panel being installed in the first and second receptors; and wherein the first capture feature comprises a first wall on first side of the first base and a second wall on a second side of the first base, and wherein a distance between the first side and the second side is selected to hold a first end of a glazed panel between the first side and the second side.

2. The system of claim 1, wherein the second end of the glazed panel rests against the base of the second receptor and the first end of the glazed panel is separated from the base of the first receptor.

3. The system of claim 2, wherein a distance across the glazed panel from the first end to the second end is less than a distance between the first base and the second base and more than a distance between the distal end of the first capture feature and the distal end of the second capture feature.

4. The system of claim 2, further comprising a panel stabilizer having a capture feature to capture a third side of the glazed panel, and wherein the panel stabilizer is fixedly coupled to the third side of the fenestration opening.

5. The system of claim 1, wherein the first wall has an offset portion that extends toward the second wall and the second wall has an offset portion that extends toward the first wall.

6. The system of claim 1, wherein the second capture feature comprises a first wall on first side of the second base and a second wall on a second side of the second base, and wherein a distance between the first side and the second side is selected to hold a second end of a glazed panel between the first side and the second side.

7. The system of claim 1, wherein the first side of the fenestration opening is a top side of the fenestration opening, and the second side of the fenestration opening is a bottom side of the fenestration opening.

8. The system of claim 1, wherein the first side of the fenestration opening is a first vertical side of the fenestration opening, and the second side of the fenestration opening is a second vertical side of the fenestration opening.

9. A fixed window system, comprising:

a first receptor fixedly mounted on a first side of the fenestration opening and which spans a width of the first side of the fenestration opening, the first receptor having a first base and a first capture feature that extends from the first base, a first capture distance being defined between a distal end of the first capture feature, that is furthest from the first base, and the first base; and a second receptor fixedly mounted on a second side of the fenestration opening opposite the first side of the fenestration opening and which spans a width of the second side of the fenestration opening, the second receptor having a second base and a second capture feature that extends from the second base, a second capture distance being defined between a distal end of the second capture feature, that is furthest from the second base, and the second base;

a glazed panel having a frame installed between the first receptor and the second receptor such that a first end of the frame is captured by the capture feature of the first receptor, a second end of the frame that is opposite the first end is captured by the capture feature of the second receptor, and wherein the frame is fixed in place in the first and second receptors;

wherein the first capture distance is greater than the second capture distance, and wherein the first receptor and the second receptor are oriented to hold the glazed panel in a vertical orientation; and wherein the first capture feature comprises a first wall on first side of the first base and a second wall on a second side of the first base, and wherein a distance between the first side and the second side is selected to hold the first end of the glazed panel between the first side and the second side.

10. The fixed window system of claim 9, wherein caulk is applied in a gap between the frame and first receptor and a gap between the frame and the second receptor.

11. The fixed window system of claim 9, wherein the frame is sized such that the first receptor, second receptor, and the frame cover the entire fenestration opening.

12. The window system of claim 9, wherein the first side of the fenestration opening is a top side of the fenestration opening, and the second side of the fenestration opening is a bottom side of the fenestration opening.

13. The window system of claim 9, wherein the first side of the fenestration opening is a first vertical side of the fenestration opening, and the second side of the fenestration opening is a second vertical side of the fenestration opening.

14. A system for installing a glazed panel in a fenestration opening, comprising:

a first receptor fixedly mounted on a first side of the fenestration opening and which spans a width of the first side of the fenestration opening, the first receptor being configured to receive a first end of the glazed panel and having a first base and a first capture feature that extends from the first base, a first capture distance being defined between a distal end of the first capture feature, that is furthest from the first base, and the first base;

a second receptor fixedly mounted on a second side of the fenestration opening opposite the first side of the fenestration opening and which spans a width of the second side of the fenestration opening, the second receptor being configured to receive a second end of the glazed panel and having a second base and a second capture feature that extends from the second base, a second capture distance being defined between a distal end of the second capture feature, that is furthest from the second base, and the second base;

wherein the first capture distance is greater than the second capture distance, and wherein the first receptor and the second receptor are oriented to hold the glazed panel in a vertical orientation and wherein the first receptor and the second receptor are configured to hold the glazed window panel fixed in place upon the glazed panel being installed in the first and second receptors; and wherein the second capture feature comprises a first wall on first side of the second base and a second wall on a second side of the second base, and wherein a distance between the first side and the second side is selected to hold a second end of a glazed panel between the first side and the second side.

15. The system of claim 14, wherein the second end of the glazed panel rests against the base of the second receptor and the first end of the glazed panel is separated from the base of the first receptor.

16. The system of claim 15, wherein a distance across the glazed panel from the first end to the second end is less than a distance between the first base and the second base and more than a distance between the distal end of the first capture feature and the distal end of the second capture feature.

17. The system of claim 15, further comprising a panel stabilizer having a capture feature to capture a third side of the glazed panel, and wherein the panel stabilizer is fixedly coupled to the third side of the fenestration opening.

18. The system of claim 14, wherein the first capture feature comprises a first wall on first side of the first base and a second wall on a second side of the first base, and wherein a distance between the first side and the second side is selected to hold a first end of a glazed panel between the first side and the second side.

19. The system of claim 14, wherein the first side of the fenestration opening is a top side of the fenestration opening, and the second side of the fenestration opening is a bottom side of the fenestration opening.

20. The system of claim 14, wherein the first side of the fenestration opening is a first vertical side of the fenestration opening, and the second side of the fenestration opening is a second vertical side of the fenestration opening.

* * * * *